United States Patent
Goodman et al.

(10) Patent No.: US 10,871,996 B2
(45) Date of Patent: Dec. 22, 2020

(54) DETECTION, MODELING AND APPLICATION OF MEMORY BANDWITH PATTERNS

(71) Applicant: Oracle International Corporation, Redwood City, CA (US)

(72) Inventors: Daniel J. Goodman, Bagillt (GB); Timothy L. Harris, Cambridge (GB); Roni T. Haecki, Niederglatt (CH)

(73) Assignee: Oracle International Corporation, Redwood City, CA (US)

( * ) Notice: Subject to any disclaimer, the term of this patent is extended or adjusted under 35 U.S.C. 154(b) by 133 days.

(21) Appl. No.: 16/163,462

(22) Filed: Oct. 17, 2018

(65) Prior Publication Data

US 2020/0125411 A1  Apr. 23, 2020

(51) Int. Cl.
*G06F 9/44* (2018.01)
*G06F 9/50* (2006.01)

(52) U.S. Cl.
CPC ............ *G06F 9/5016* (2013.01); *G06F 9/505* (2013.01)

(58) Field of Classification Search
CPC ..... G06F 9/5016; G06F 9/505; G06F 13/1694
See application file for complete search history.

(56) References Cited

U.S. PATENT DOCUMENTS

| | | | | |
|---|---|---|---|---|
| 2009/0150893 A1* | 6/2009 | Johnson | ................ | G06F 9/5088 718/104 |
| 2012/0054425 A1* | 3/2012 | Matas | ................... | G06F 9/3851 711/105 |
| 2013/0305009 A1* | 11/2013 | Durant | .................. | G06F 9/5016 711/170 |
| 2014/0201477 A1* | 7/2014 | Greenfield | ............ | G06F 3/0647 711/158 |
| 2018/0113965 A1* | 4/2018 | Harris | ................... | G06F 9/5066 |

OTHER PUBLICATIONS

Zoltan Majo et al, "Memory System Performance in a NUMA Multicore Multiprocessor", 2011, pp. 1-10.

(Continued)

*Primary Examiner* — Duy Khuong T Nguyen
(74) *Attorney, Agent, or Firm* — Robert C. Kowert; Kowert, Hood, Munyon, Rankin & Goetzel, P.C.

(57) ABSTRACT

A system configured to implement detection, modeling and application of memory bandwidth patterns may predict performance of multi-threaded applications with different thread placements. Additionally, such a system may model bandwidth requirements of an application based on placement of the application's threads and may generate a bandwidth signature by sampling performance counters while executing the application using specific thread placement and determining values for multiple classes of bandwidth, such as static, local, per-thread and interleaved. Performance counters may information such as elapsed time, number of instructions executed, and/or the volume of data read or written to each memory bank. A bandwidth signature may be used to apply bandwidth requirements to differing thread placements within various types of systems, such as performance prediction systems, data structure libraries, as well as debugging and development systems.

16 Claims, 19 Drawing Sheets

(56) References Cited

OTHER PUBLICATIONS

Yuejian Xie et al, "Dynamic Classification of Program Memory Behaviors in CMPs", pp. 1-9, Jan. 2008.
Moinuddin K. Qureshi et al, "Adaptive Insertion Policies for High Performance Caching", 2007, pp. 1-11.
Alexander Collins et al "Lira: Adaptive Contention-Aware Thread Placement for Parallel Runtime Systems", dated 2015, pp. 1-8.
Daniel Goodman et al "Pandia: Comprehensive Contention-Sensitive Thread Placement", 2017, pp. 1-16.
Iraklis Psaroudakis et al, "Analytics with Smart Arrays: Adaptive and Efficient Language-Independent Data", 2018, pp. 1-15.
Tanima Dey et al, "ReSense: Mapping Dynamic Workloads of Colocated Multithreaded Applications Using Resource Sensitivity", ACM Transactions on Architecture and Code Optimization, vol. 10, No. 4, Article 41, Dec. 2013, pp. 1-25.
Bergey Zhuravlev, "Addressing Shared Resource Contention in Multicore Processors Via Scheduling", 2010, pp. 1-13.
Mohammad Dashti, "Traffic Management: A Holistic Approach to Memory Placement on NUMA Systems", 2013, pp. 1-13.
Tim Harris et al, "Callisto-RTS: Fine-Grain Parallel Loops", Usenix the Advanced Computing Systems Association, 2015, pp. 1-13.
L:argi Balkesen et al, "Main-Memory Hash Joins on Multi-Core CPUs: Tuning to the Underlying Hardware", pp. 1-12, Apr. 2013.
Bergey Blagodurov, A Case for NUMA-aware Contention Management on Multicore Systems pp. 1-15, Jun. 2011.
Dhruba Chandra et al, "Predicting Inter-Thread Cashe Contention on a Chip Multi-Processor Architecture", pp. 1-10, Feb. 2005.
Alexandra Fedorova et al, "Improving Performance Isolation on Chip Multiprocessors via an Operating System Scheduler", pp. 1-13, Sep. 2007.
Gaurav Dhiman et al "vGreen: A System for Energy-Efficient Management of Virtual Machines", 2010, pp. 1-27.
Gerd Zellweger et al, "So Many Performance Events, So Little Time" 2016, pp. 1-9.
Tan Li et al "Characterization of Input/Output Bandwidth Performance Models in NUMA Architecture for Data Intensive Applications", pp. 1-10, Oct. 2013.
Robert L. McGregor et al, "Scheduling Algorithms for Effective Thread Pairing on Hybrid Multiprocessors", Proceedings of the 19th IEEE International Parallel and Distributed Processing Symposium, 2005, pp. 1-11.
Ryan Braithwaite et al, "Empirical Memory-Access Cost Models in Multicore NUMA Architectures", pp. 1-11, Sep. 2011.
Stefan Lankes et al, "Node-Based Memory Management for Scalable NUMA Architectures", 2012, pp. 1-8.
Andreas Merkel et al, "Resource-conscious Scheduling for Energy Efficiency on Multicore Processors", 2010, pp. 1-14.
Gabriel Mann et al, "Cross-Architecture Performance Predictions for Scientific Applications Using Parameterized Models", ACM Sigmetrics Performance 2004, pp. 1-12.
D. Bailey et al, "The NAS Parallel Benchmarks", 1994, pp. 1-79.
Matthias S. Muller et al, "Spec OMP2012-An Application Benchmark Suite for Parallel Systems Using OpenMP", 2012, p. 1-15.
Jiang Lin et al, "Gaining Insights into Multicore Cache Partitioning: Bridging the Gap between Simulation and Real Systems", pp. 1-12, Feb. 2008.
Aleksandar Prokopec et al, "A Generic Parallel Collection Framework", 2010, pp. 1-10.
Rob Knauerhase et al, "Using OS Observations to Improve Performance in Multicore Systems", pp. 1-44, Jun. 27, 2008.
Nest Rich et al, "Online Cache Modeling for Commodity Multicore Processors", 2010, pp. 1-12.

\* cited by examiner interleaved bandwidth local bandwidth symmetric asymmetric

DETECTION, MODELING AND APPLICATION OF MEMORY BANDWITH PATTERNS

BACKGROUND

Field of the Disclosure

This disclosure relates generally to concurrent programming, and more particularly to placement of memory and threads in multi-core systems, such as data analytics computers with multiple sockets per machine, multiple cores per socket, and multiple thread contexts per core.

Description of the Related Art

Modern computer systems, such as those used for data analytics are often systems with multiple sockets per machine, multiple cores per socket and multiple thread contexts per core. To get peak performance from these systems generally requires the correct placement of threads within the machine. Traditional techniques for determining placement of threads and/or memory (e.g., memory allocation) have involved monitoring instructions-per-cycle (IPC) counts, last-level cache (LCC) misses, sampling instructions as they are executed (e.g., to identify memory loads and stores as well as where they are located), monitoring page faults (e.g., to identify suboptimal page placement and configurations), as well as timing executed benchmarks (e.g., to determine latency and/or other properties).

However, many of these traditional techniques require a detailed specification of the system, typically generated ahead of time, and/or cannot apply corrections to differing thread counts effectively.

BRIEF DESCRIPTION OF THE DRAWINGS

FIG. 5A-D are a logical block diagrams illustrating four example bandwidth classes, according to one embodiment.

Figure 1:
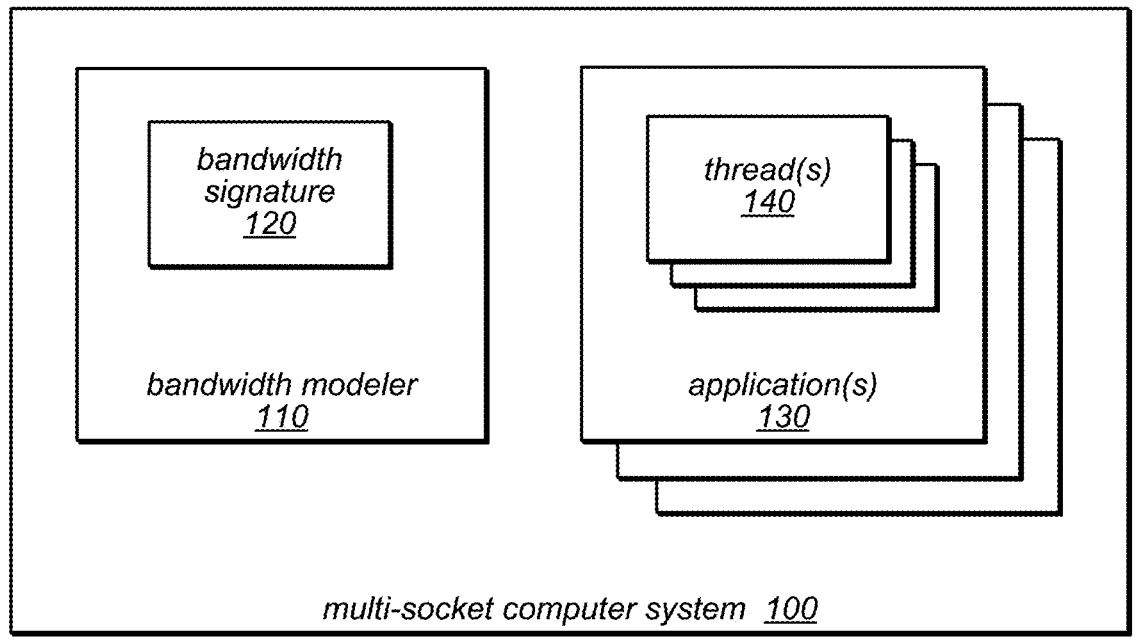
FIG. 1 is a logical block diagram illustrating a system configured to implement one embodiment of Detection, Modeling and Application of Memory Bandwidth Patterns, as described herein.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

SUMMARY

Described herein are systems, methods, mechanisms and/or techniques for implementing Detection, Modeling and Application of Memory Bandwidth Patterns. A system, program and/or other tool may be configured to predict performance of multi-threaded applications with different thread placements. Additionally, the systems, methods, mechanisms and/or techniques described herein may, in some embodiments, model bandwidth requirements of an application based on placement of the application's threads. Such a bandwidth model may be generated by sampling performance counters (e.g., hardware performance counters) while the application executes with specific thread placements, according to some embodiments. Result of bandwidth modeling may be used in various manners, such as performance debugging (e.g., during development), performance and/or system load prediction, and/or the allowing libraries (e.g., libraries of data structures) to better utilize the bandwidth of application using the libraries.

Detection, Modeling and Application of Memory Bandwidth Patterns as described herein may include and/or utilize techniques for modelling bandwidth in a manner that may more accurately reflect the bandwidth requirements of an application, such as for use when predicting the performance of a job (e.g., a workload being performed by the application).

Detection, Modeling and Application of Memory Bandwidth Patterns may be used, in some embodiments, to optimize performance of a given workload, such as identifying whether multiple sockets should be used, and whether a given workload may benefit from using multiple threads per core. In addition, the techniques described herein may be used to identify opportunities for reducing resource consumption where additional resources may not be matched by additional performance, such as for instance, limiting a workload to a small number of cores when its scaling is poor, according to various embodiments.

A system configured to implement Detection, Modeling and Application of Memory Bandwidth Patterns may predict the performance of parallel workloads on shared-memory multi-core/multi-socket machines and may select how many threads to use when running a given workload. Additionally, systems described herein may determine where to place these threads within the machine (e.g., on which CPU and/or sockets on which to execute thread). For example, some workloads may benefit from having their threads kept within a single CPU in a multi-core/multi-socket machine whereas other workloads may benefit from being spread widely across multiple sockets. Additionally, some workloads may benefit from using multiple hardware threads in each core, whereas others may not. Thus, a system implementing Detection, Modeling and Application of Memory Bandwidth Patterns may determine where to place threads for a given workload with a given system, according to various example embodiments.

In some embodiments, a system configured to implement Detection, Modeling and Application of Memory Bandwidth Patterns may utilize one or more initial profiling runs to collect data on various aspects of system performance. For example, in one embodiment, two profiling runs may be utilized: a first with an even number of threads where every thread has its own core and every socket has the same thread count and a second profiling run that uses the same thread count but with a different number of threads per socket.

DETAILED DESCRIPTION OF EMBODIMENTS

The techniques described herein may, in some embodiments, implement a system for modeling the performance characteristics and resource demands of parallel in-memory workloads. For instance, based on one or more profiling runs, memory bandwidth patterns may be modeled and a workload's performance may be quantitatively predicted across different numbers of threads and different placements of those threads within a machine. The results of the modelling and predicting may be used to determine memory and/or thread allocation for a given workload and/or resources needed for a workload to meet a specified performance target, according to some embodiments.

A bandwidth modeler may be configured to implement one or more of the techniques described herein regarding Detection, Modelling and Prediction of Memory Access Patterns. A bandwidth modeler, as described herein may be a standalone component (e.g., an application, program, library, API, etc.), or may be implemented as part of, or be utilized by, another system, product, program ,etc., according to various embodiments. For instance, in one embodiment, a bandwidth modeler may be implemented as part of a larger system configured to detect, observe, measure, model, and/or predict performance and/or resource demands of parallel in-memory workloads. The systems, methods, mechanisms and/or techniques described herein may also include characterizing a workload's performance, such as by utilizing one or more profiling techniques, according to various embodiments. For example, a system configured to implement Detection, Modeling and Application of Memory Bandwidth Patterns may determine the use of different functional units by observing behavior of test programs co-scheduled on the same cores, and/or quantifying the impact of inter-socket and inter-core communication, according to some embodiments.

When executing bandwidth limited workloads as part of data analytics, bandwidth limitations may result in performance reductions, according to some embodiments. Additionally, one potentially interesting element of the placement of memory and threads is the way it effects the movement of data around the machine, and the increased latency this can introduce to reads and writes. Described herein are systems, methods and/or techniques for modeling the bandwidth requirements of an application (e.g., such as on a NUMA compute node) based at least in part on the placement of threads. In one embodiment, a bandwidth model, profile or signature may be constructed by sampling performance counters while the application executes with carefully chosen thread placements. As used herein, modeled memory access patterns may refer to bandwidth models and/or bandwidth signatures. The results of bandwidth modeling may be used in differing ways according to various embodiments. For example, bandwidth models may be utilized with: performance debugging during development where the programmer can be alerted to potentially problematic memory access patterns, systems that take an application and predict the performance and system load of a proposed thread count and placement, abstracting user memory and thread placement issues when parallelizing code (e.g., by libraries of data structures).

FIG. 1 is a logical block diagram illustrating a system configured to implement Detection, Modelling and Application of Memory Bandwidth Patterns, as described herein. The illustrated computer system may be configured to model the performance of in-memory parallel workloads with differing thread counts and placements, according to one embodiment. As illustrated in FIG. 1, a multi-socket computer system 100, which may in some embodiments be a multi-core system or a multi-socket system, may include an in-memory bandwidth modeler 110 configured to model the performance of in-memory parallel workloads with differing thread counts and placements, as described herein.

In some embodiments, computer system 100 and/or bandwidth modeler 110 may be configured to model the bandwidth utilization across a machine by splitting the usage into 4 well defined classes of memory access pattern that can be combined to describe the memory access pattern of the application threads. The fraction of each thread's memory accesses that can be attributed to each of these patterns may be measured through profiling runs (e.g., 2 in some embodiments). The resulting bandwidth signature may then be used to apply bandwidth requirements to varying thread placements. Separate signatures may be constructed for reads and writes, but the measurements required for these two signatures may be taken during a single set of profiling runs.

Thus, in some embodiments, bandwidth modeler 110 may be configured to cause one or more profiling runs to be executed while monitoring one or more hardware performance counters. Data results from the hardware performance may then be utilized to construct bandwidth signature (or model) for one or more threads 140 of one or more applications 130 executing on the multi-socket computer system 100.

Figure 2:
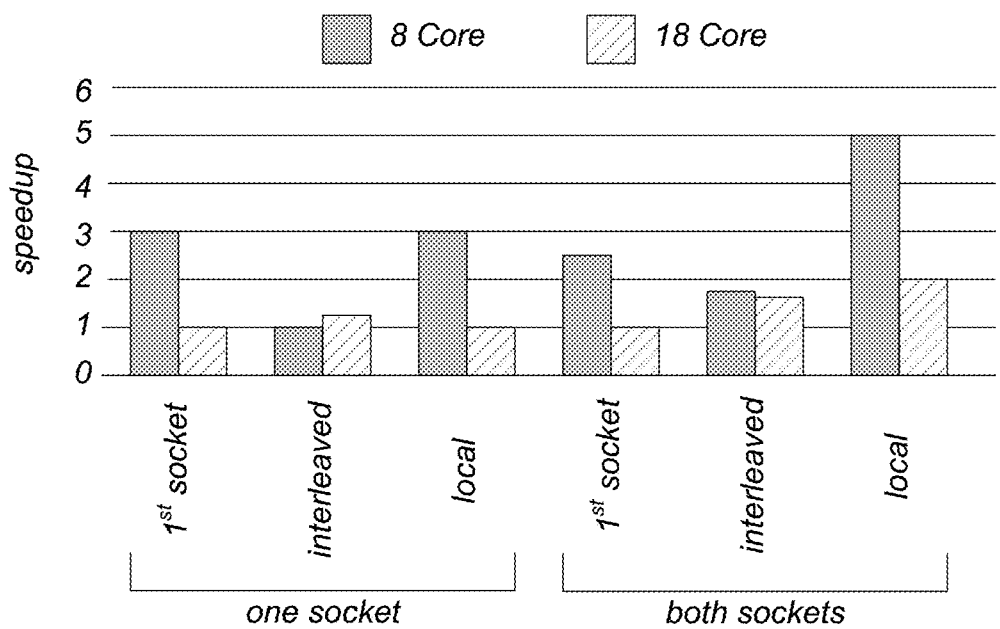
FIG. 2 is a graph illustrating performance of a memory intensive application on different hardware with different thread and memory placements, according to one example embodiment.

Turning now to FIG. 2, which is a graph illustrating performance of a memory intensive application on different hardware with different thread and memory placements, according to one example embodiment. The graph in FIG. 2 illustrates performance of different thread and memory placements on different 2 socket machines, according to one example embodiment. Speedup shown in FIG. 2 is relative to the slowest configuration for each machine while the results are labeled by the memory placement (e.g., $1^{st}$ socket, interleaved and local) and then by thread placement (e.g., one socket and both sockets).

Each run illustrated in FIG. 2 is normalized relative to the slowest run on a given machine. The same benchmark (e.g., a memory-intensive synthetic benchmark) may be used for all runs with enough threads to place a single thread on each core of a single socket—that is 8 and 18 threads respectively in graph illustrated in FIG. 2. When running with 2 sockets these threads may be split evenly with each thread placed in its own core. According to one example embodiment, the memory placements may be: all memory on the first socket, memory interleaved between sockets at the granularity of a page giving 50% remote accesses, and all a threads memory located locally to the thread giving 0% remote accesses, according to the example embodiment.

Figure 3:
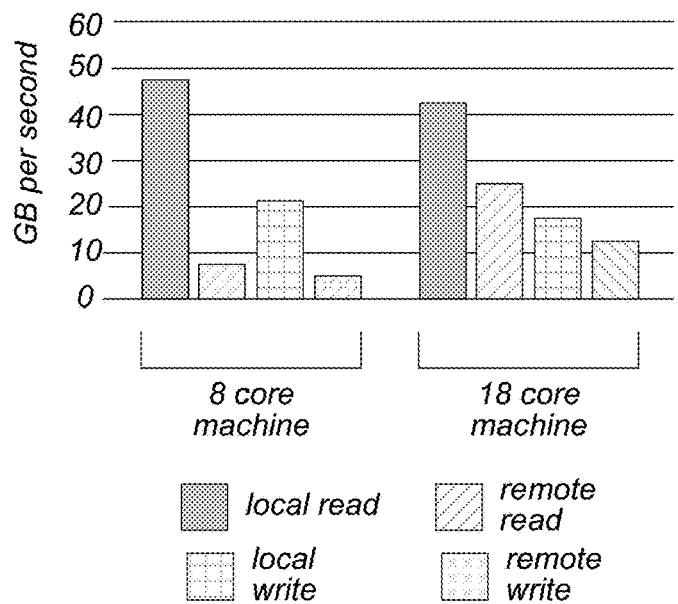
FIG. 3 is a graph illustrating different memory bandwidths available on different systems, according to one embodiment.

Thus, when using a single socket for the 18 core system there may be little difference between accessing data remotely and accessing it locally with the CPU acting as the limiting factor, while for the 8 core system there may be a 3× slowdown relative to the quickest placement, according to the example embodiment. Additionally, when running an application with shared memory, the fastest placement for the 18 core machine may be to spread the threads and the data evenly across the machine interleaving the memory to spread the bandwidth load evenly. For the 8 core machine peak performance may be achieved by keeping all the data and threads on a single socket avoiding remote communication. As illustrated in FIG. 2, the 18 core machine may be more forgiving of thread and memory placement, however the 8 core machine may have a higher bandwidth to the local memory, as illustrated in FIG. 3. FIG. 3 is a graph illustrating different memory bandwidths available on different systems, according to one embodiment. Additionally, the 8 core machine may be a substantially less expensive machine. Thus, if the placement of memory and threads can be correctly organized there is potential to save both time and money on memory-limited applications. FIG. 3 also demonstrates the dramatic difference in bandwidth for 2 apparently similar machines.

As noted above systems, methods, and/or techniques for implementing Detection, Modeling and Application of Memory Bandwidth Patterns, as described herein may be utilized with, within, as part of, and/or in conjunction with various other systems, such performance prediction, data libraries, and/or debugging and development, according to various embodiments.

Performance Prediction: Systems that seek to model the performance of a workload in a given configuration may need to predict resource demands. Currently, such systems typically use a static placement for all threads, or measure the distribution of bandwidth during one of the measurement runs and assume that it will stay the same throughout all further thread placements. However, the systems, methods and/or techniques described herein may allow for more detailed bandwidth requirements, thereby potentially resulting in more accurate performance predictions with differing thread counts and placements. An example embodiment of detecting, modeling and applying memory bandwidth patterns within a performance prediction system is described herein after a more detailed description of methods and techniques for implementing detecting, modeling and applying memory bandwidth patterns.

Data Structure Libraries: When libraries abstract the memory placement from the user, the library may need to make decisions about how best to layout the memory. Currently such systems generally make the assumption that at the time that the collection is being used for data processing the application will not be doing anything else. However the assumption that all the data used by the application will be in collections belonging to the library may be considered a restrictive one. Use of a bandwidth model (or signature) may provide the opportunity to better model bandwidth requirements and/or to make allowances for this at run time, such as when placing the data stored by the library into memory, according to some embodiments.

Debugging and Development: Applications typically run in many environments and performance critical applications may have to be tested in multiple (or even each) target environment. By modeling the bandwidth requirements of the application with different thread placements and against different hardware descriptions, as described herein, it may be possible to notify a programmer of potential problems before the application reaches the testing stage, thereby potentially allowing an earlier fix.

Detection, Modeling and Application of Memory Bandwidth Patterns are described herein mainly with reference to multi-socket NUMA machines with performance counters to record their activity, according to some embodiments. An example of a 2 socket machine can be seen in FIG. 4, which is a logical block diagram illustrating a 2 socket NUMA machine, according to one example embodiment.

Figure 4:
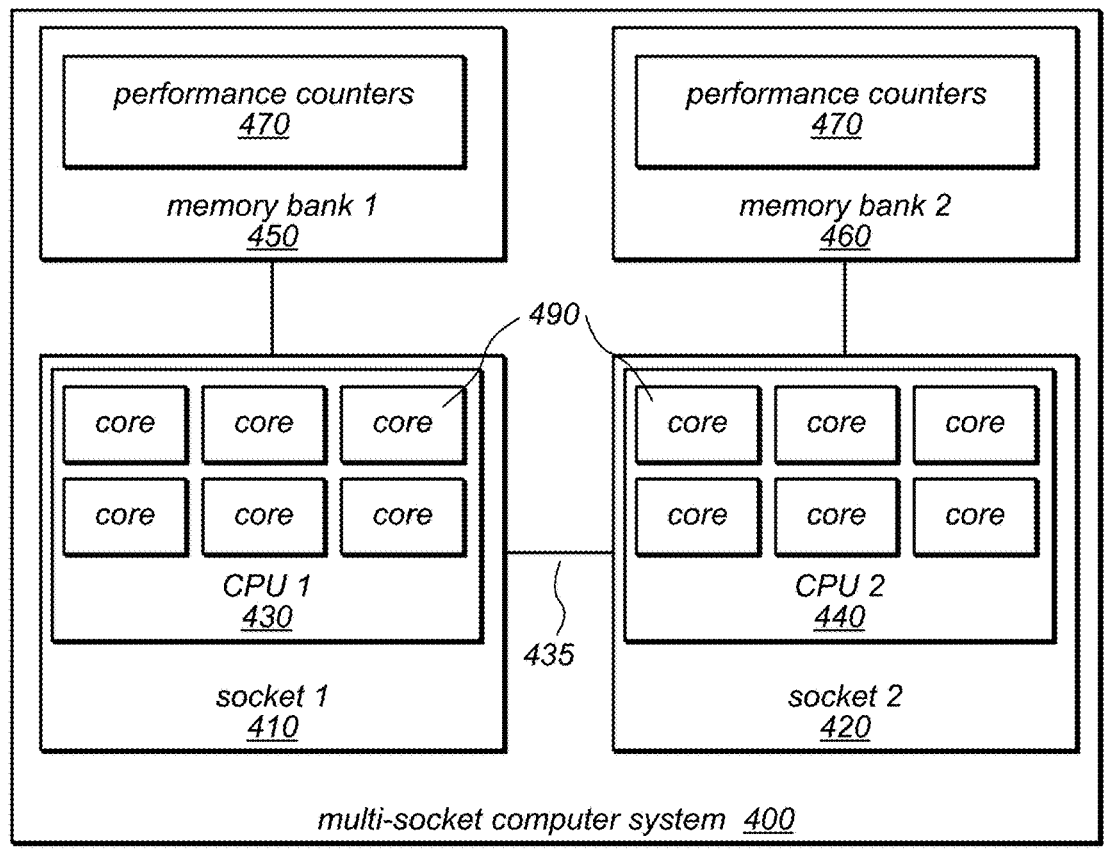
FIG. 4 logical block diagram illustrating a 2 socket NUMA machine for use with Detection, Modeling and Application of Memory Bandwidth Patterns, according to one example embodiment.
Figure 5A:
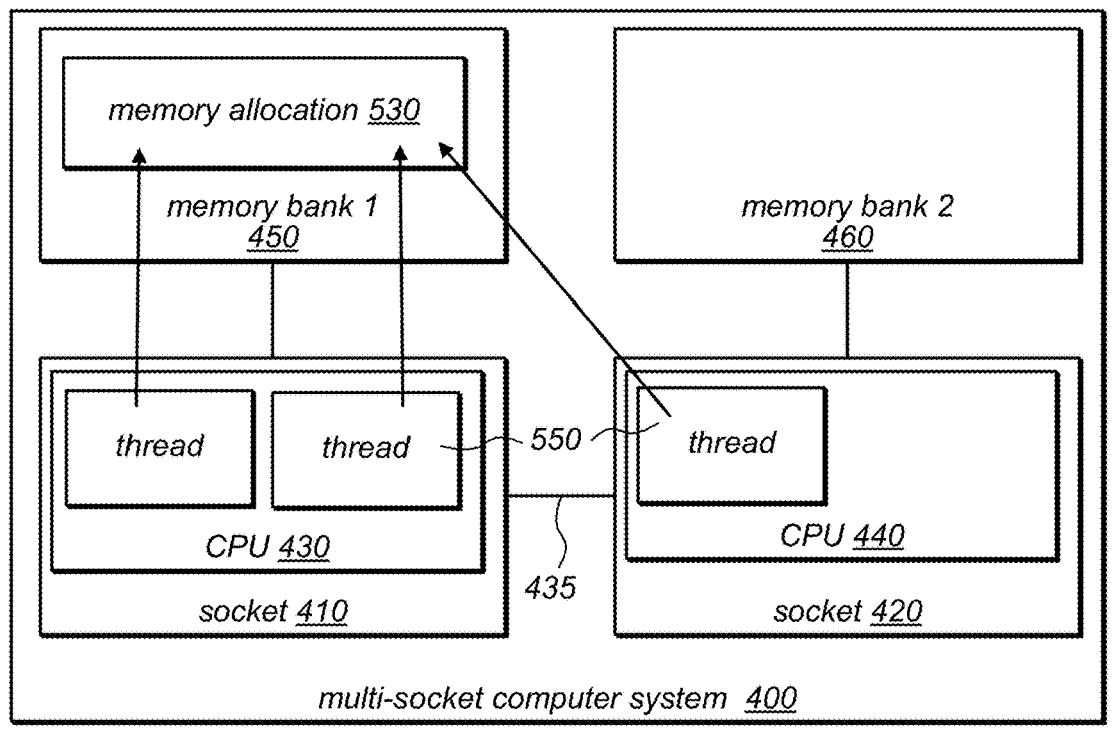
Figure 5B:
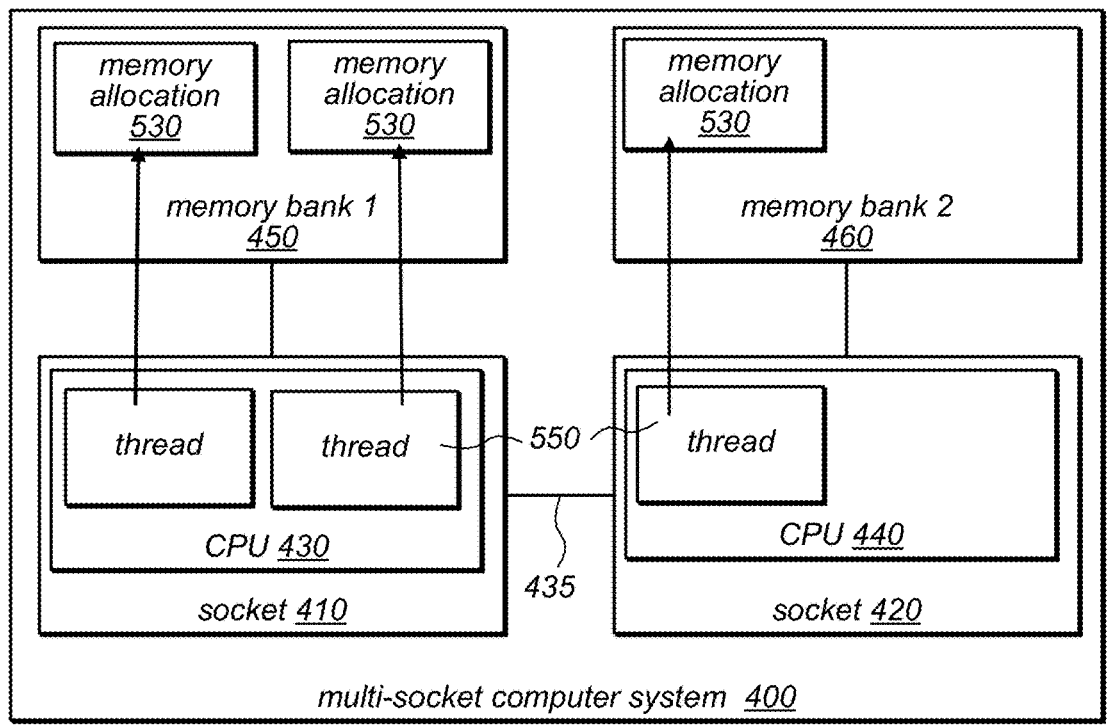
Figure 5D:
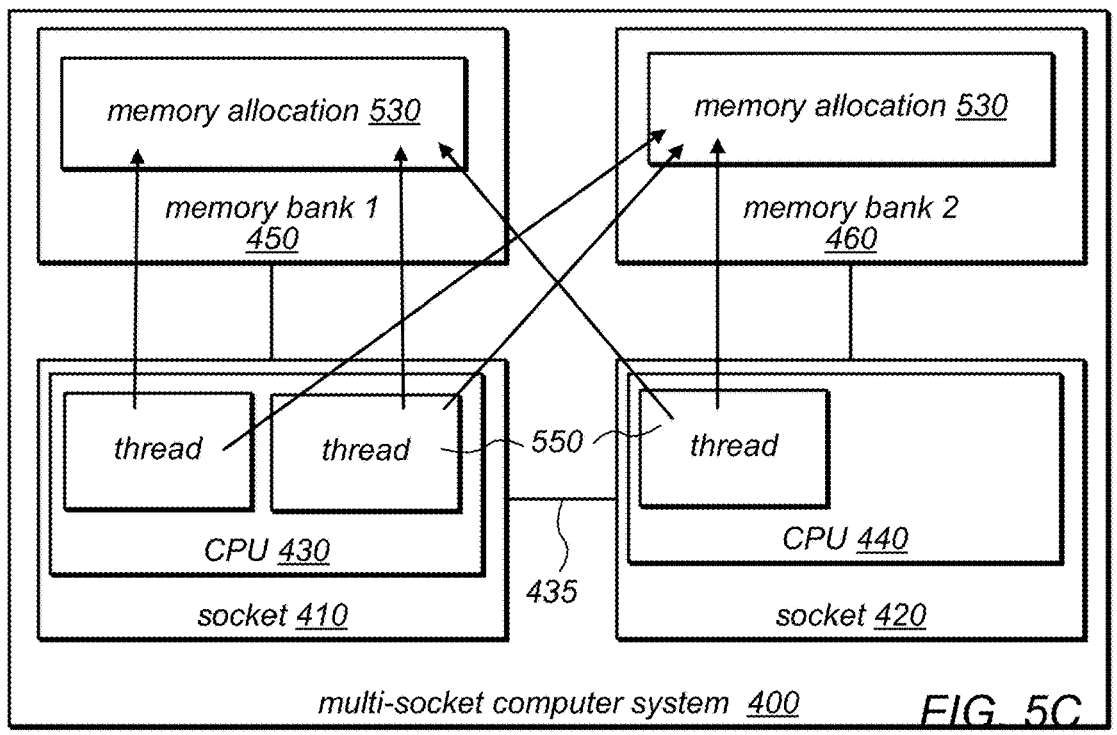
Figure 5D:
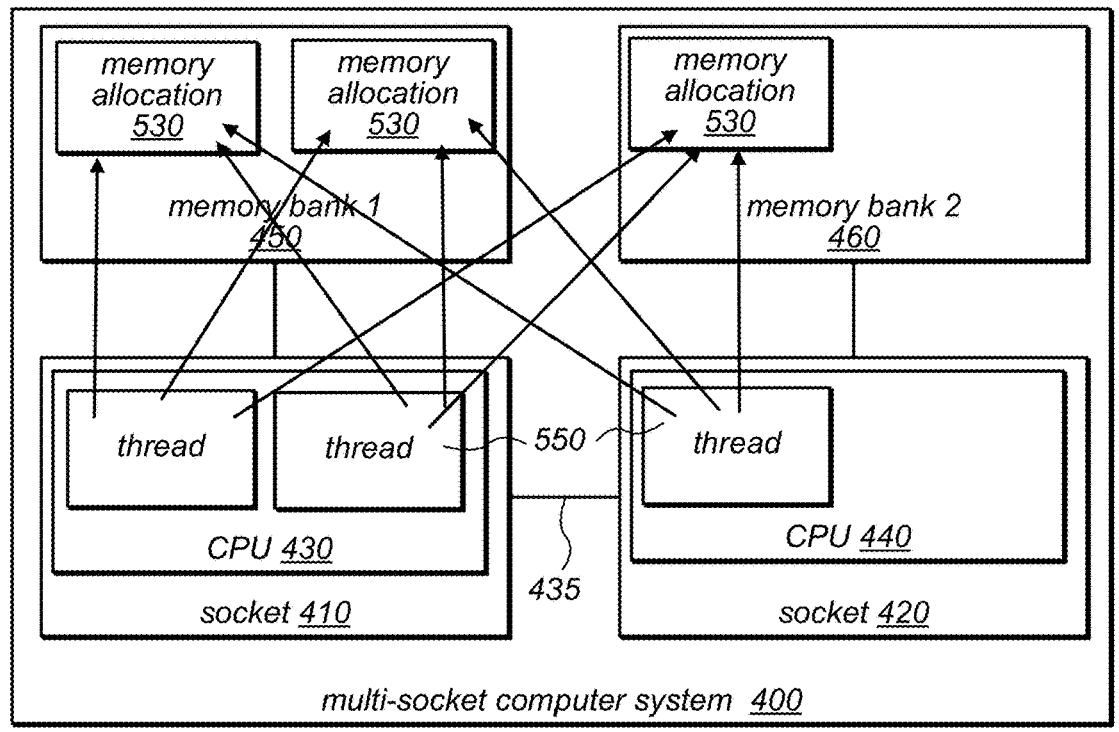

As illustrated in FIG. 4, an example 2 socket machine, such as multi-socket computer system 400, may include memory banks 450 and 460 attached to each socket 410 and 420 via memory channels 425, and with the sockets connected via an interconnect 435. Information about the performance applications may be captured via performance counters 470. The CPUs 430 and 440 may provide performance counters 470 through supporting tools, such as Performance Counter Monitor (PCM) according to some embodiments. While some variation may appear between different manufactures, the counters offered by manufactures may be considered sufficiently similar that the techniques described here may be applied with minimal modifications, according to various embodiments. Note that in some embodiments, system 400 may be the same as system 100, described above.

Performance Counters

Performance counters, such as performance counters 470, may monitor and/or provide various types of information, such as elapsed time, number of instructions executed, and/or the volume of data read or written to each memory bank. The information provided by performance counters 470 may be separated into data to and from the local socket and data to and from remote sockets. While performance counters recording the volume of data to and from the memory banks may be located on the memory controller contained within CPUs 430 or 440, they are logically illustrated in FIG. 4 within memory banks 450 and 460 to emphasize that the information provided by performance counters 460 is from the perspective of the memory bank, rather than the processor regarding local and remote accesses, according to some embodiments. So for example if 2 threads on CPU 430 and 1 thread on CPU 440 are all running at the same speed, and all sending ½ of their accesses to each of the memory banks 450 and 460, then from the point of view of the CPUs ½ of memory accesses are to remote locations, and ½ are to local locations. However from the point of view of memory banks 450 and 460, ⅔ and ⅓ of the accesses are local respectively with the remainder being remote accesses. According to some embodiments, it may be this view that is reported by the program counters 470. The point of view (e.g., perspective) reflected by the performance counters may vary from embodiment to embodiment. In one embodiment, the perspective may be from the point of view of the memory banks, while in another embodiment, it may be from the point of view of the CPUs. Additionally, the perspective reflected by the performance counters may be changed by exchanging which socket is considered local versus those that are considered remote, according to some embodiments.

Bandwidth Signatures

As noted above, observations about where memory is allocated may not be helpful to determining bandwidth requirements saturating interconnects, as a relatively small piece of memory may be accessed many times while a larger piece of memory may be seldom accessed. To improve on the bandwidth model multiple classes of bandwidth (e.g., 4 is some embodiments) may be specified and measured in a profiling phase. Thus, a model of the bandwidth utilization across a machine may be constructed by splitting the usage into multiple classes of memory access pattern that can be combined to describe the memory access pattern of the application threads. For example, in one embodiment, bandwidth utilization may be split into 4 well defined bandwidth classes. The fraction of each thread's memory accesses that can be attributed to each of these patterns may be measured through profiling runs and the resulting model may be referred to herein as a bandwidth signature.

A bandwidth signature may be used to apply bandwidth requirements to differing thread placements. Separate signatures may be constructed for reads and writes, but the measurements required for these two signatures may be taken during a single set of profiling runs, according to some embodiments.

Example bandwidth classes (or memory access types) can be seen in FIG. 5A-D, which is a logical block diagram illustrating four example bandwidth classes, according to one embodiment. The example bandwidth classes illustrated in FIG. 5A-D are described below with reference to a system with s sockets and executing a workload using n threads, according to one example embodiments. Note that while described herein in terms of 4 bandwidth classes, different numbers of bandwidth classes may be used in various situations according to different embodiments.

Bandwidth Classes:

Static Bandwidth: Access to memory that is allocated on the RAM attached to a single socket (e.g., in a single memory bank) but used by all threads. For example if the master thread loads the input data or the output array is allocated on a single socket. In some embodiments, a static bandwidth class may represent and/or correspond to accesses to memory allocated in a single memory bank used by all threads of the workload.

Local Bandwidth: Access to memory that is only accessed by the threads on the same socket as the memory (e.g., replicated data structures, or thread local data). In some embodiments, a local bandwidth class may represent and/or correspond to accesses to memory by threads on the same sockets as which the memory is allocated.

Per-thread Bandwidth: Access to memory where each thread allocates 1/n of the memory locally, but the memory is used by all threads. For example if each thread loads 1/n of the data, or the threads are constructing and using a shared data structure such as a tree. In some embodiments, a per-thread bandwidth class may represent and/or correspond to accesses to memory allocated by one thread and used by all threads of the workload.

Interleaved Bandwidth: Access to memory that is allocated evenly across the used sockets such that each socket has 1/s of the data. (e.g., if the interleave flag has been used in numactl, according to one embodiment). In some embodiments, an interleaved bandwidth class may represent and/or correspond to accesses to memory allocated evenly across the sockets.

Applying Bandwidth Signatures to Thread Placement

Figure 6:
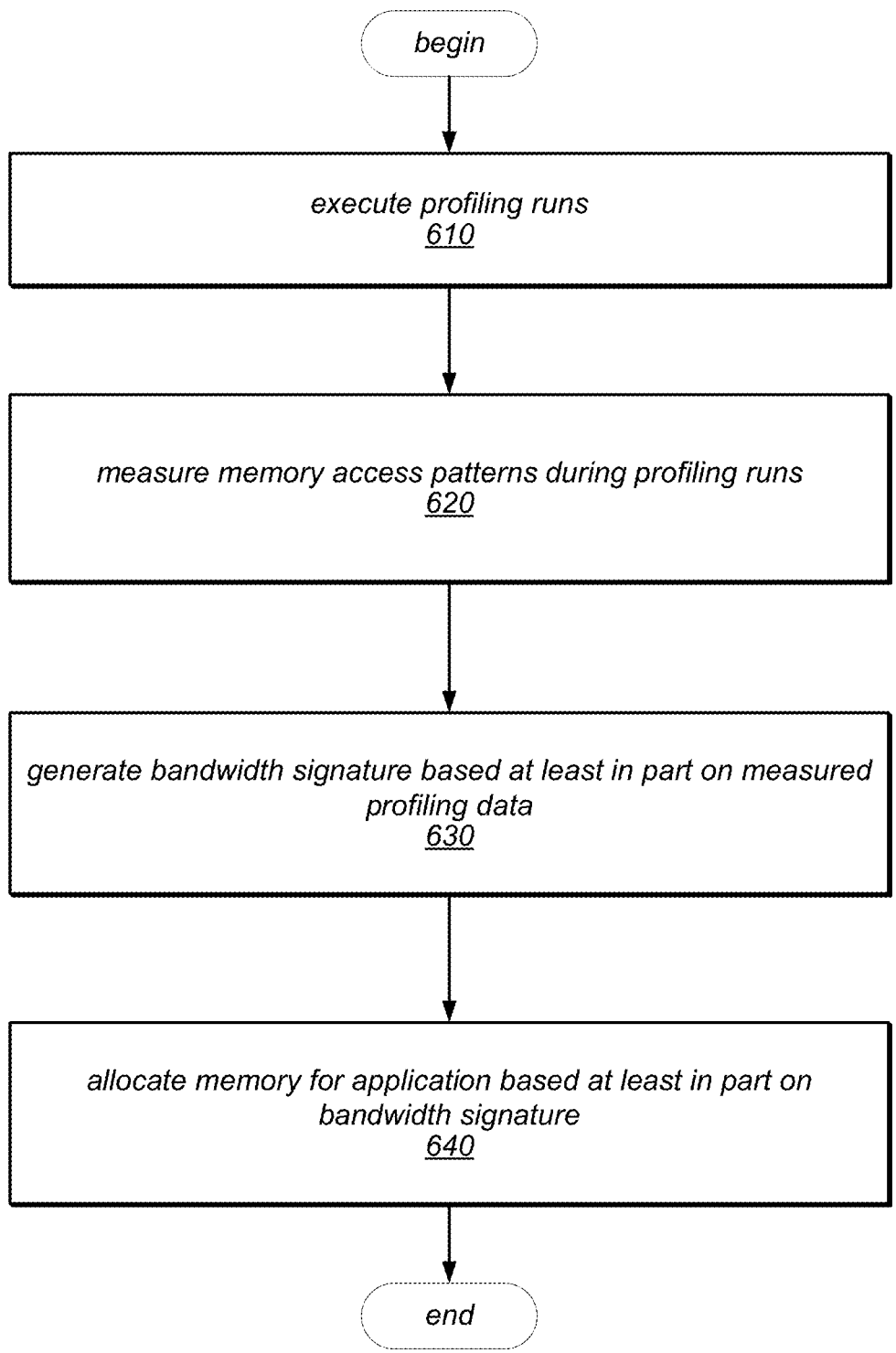
FIG. 6 is a flowchart illustrating one embodiment of a method for Detection, Modeling and Application of Memory Bandwidth Patterns, as described herein.

FIG. 6 is a flowchart illustrating one embodiment of a method for implementing Detection, Modelling and Application of Memory Bandwidth Patterns, as described herein. As in block 610, a bandwidth modeler 110 may be configured to execute one or more profiling runs, such as to collect data on various aspects of system performance, according to some embodiments. For example, in one embodiment, a first profiling run may have a single thread on each core and where every socket may have the same thread placement.

As shown in block 620, bandwidth modeler 110 may measure memory access patterns during the profiling runs, according to some embodiments. Thus, bandwidth modeler 110 may monitor one or more hardware performance counters, such as performance counters 470, configured to provide information related to elapsed time, number of instructions executed, and/or the volume of data read or written to each memory bank, according to some embodiments. In some embodiments, information provided by performance counters may be separated into data to and from the local socket and data to and from remote sockets.

Bandwidth modeler 110 may also be configured to generate a bandwidth signature based, at least in part, on the measured profile data, as in block 630, according to some embodiments. Thus, a model of the bandwidth utilization across a machine may be constructed by splitting the usage into multiple classes of memory access pattern that can be combined to describe the memory access pattern of the application threads. For example, in one embodiment, bandwidth utilization may be split into well-defined bandwidth classes, such as Static, Local, Per-thread and Interleaved. A bandwidth signature may be generated based at least in part on the fraction of each thread's memory accesses attributable to each of these patterns, according to some embodiments.

The results of the modelling and predicting may be used to determine memory and/or thread allocation for a given workload and/or resources needed for a workload to meet a specified performance target, according to some embodiments. Thus, in some embodiments, a bandwidth modeler 110, or another component or system, may allocate memory for an application based at least in part on the bandwidth signature, as in block 640. As noted above, a bandwidth signature may be used to apply bandwidth requirements to varying thread placements.

In some embodiments, a bandwidth model or signature may describe how the bandwidth from a thread on a given socket is expected to be distributed across the system and the total volume of data for each thread may need to be determined (e.g., calculated) independently. For example in one embodiment this may be achieved by taking the bandwidth requirement of a single thread, applying this to every thread and then scaling the bandwidths on a thread-by-thread basis, such as to allow for changes in thread performance due to issues (e.g., resource saturation).

In some embodiments, bandwidth requirements may be made up of a mix of the bandwidth classes. For example, in one embodiment, 3 properties in the range [0 . . . 1] describing the fraction of the accesses that belong to each class of bandwidth may be used to encode this for both reads and writes. For instance, the fraction of all accesses that are Per thread shared, Local, and Static, respectfully may be determined. Any remaining bandwidth may be deemed to be Interleaved. The sum of these fractions must be <=1, according to some embodiments. This gives 6 properties in total, for one example embodiment (3 properties for read accesses and 3 for write accesses). In some embodiments, these 6 properties may be augmented by properties for both read bandwidth and write bandwidth that records which memory bank (or socket) the static bandwidth was associated with, making 8 properties in total.

The techniques to calculate these properties may be applied to differing numbers of CPUs, but are described herein using just 2 CPUs for clarity. To calculate these properties, program counters that report the amount of data sent to and from the local CPU and the amount sent to and from remote CPUs may be used. Using these program counters, data from 2 runs of a workload may be collected. The first, drawn from the benchmarking runs, may be considered a job where every used core has a single thread and both sockets have the same thread placement. The second run may be an additional run which uses the same single thread per used core, but no longer has the same number of threads on each socket. To demonstrate the process an example will be used which has the properties Static socket=2, Static fraction=0.2, Local fraction=0.35, and Per thread fraction=0.3 with 1−(0.2+0.35+0.3) giving 0.15 as the value of the fraction of the bandwidth that is due to interleaved placements.

In some embodiments, the application of bandwidth models may be considered as a matrix computation with a matrix for each type of memory traffic (e.g., each bandwidth class). Within these matrices each row may represent data traveling to or from a CPU and each column may represent data traveling to or from a memory bank. Each cell of a matrix may represent the fraction of the data traveling to or from a given CPU and a given memory bank. As a result, the sum of each row may be 1, according to some embodiments.

These matrices may then be scaled by their respective fractions and summed resulting in a single matrix from which a thread may determine a fraction of its bandwidth to apply via the links to each memory bank.

Figure 13:
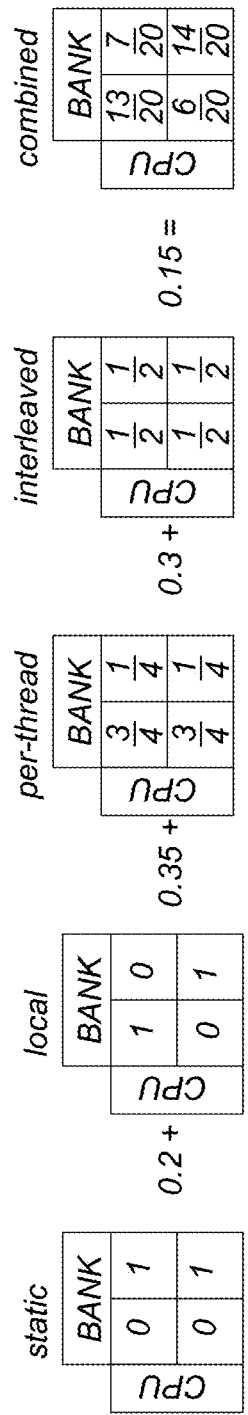
FIG. 13 is a logical diagram of matrices used to represent a bandwidth signature, according to one example embodiment.

Four example matrices can be seen in FIG. 13 and described below. FIG. 13 is a logical block diagram illustrating matrices used to represent a bandwidth signature for a placement of 4 threads on a two socket machine with 3 threads placed on the first socket and 1 thread on the second socket, according to one example embodiment. Please note FIG. 13 represents one example embodiment and that the number of rows and columns may vary from embodiment to embodiment, such as due to machines with different number of sockets and/or memory banks. Note that for the example illustrated in FIG. 13, every row sums to 1, but not every column.

Static Bandwidth: A matrix for static memory accesses may represents all traffic going to a single memory bank and therefore may consist of the column identified by the static socket property containing 1's and all other columns containing zeros, according to one embodiment.

Local Bandwidth: A matrix for local memory accesses may model all data accesses from a socket going to their corresponding memory bank. This may be represented by an identity matrix in some embodiments.

Per-thread Bandwidth: A matrix for per thread data may include of a series of columns weighted by the fraction of the threads that are on each socket. Thus, the weights for column i may be calculated by $$\frac{n_i}{\sum_{j=1}^{s} n_j}$$

where $n_i$ is the number of threads on socket i, according to one embodiment.

Interleaved Bandwidth: A matrix for interleaved data may model all accesses being spread evenly across the system. Therefore, cells where both the memory bank and the CPU are from used sockets may contain 1/s and the other cells contain 0 where s is the number of sockets in use in the placement, according to one embodiment.

While described herein in reference to matrices accessible by threads and from which threads may determine how much bandwidth (e.g., what fraction of its bandwidth) to apply to individual links to each memory bank, the exact manner and format of a bandwidth signature may vary from embodiment to embodiment. Additionally, the manner and or/method used to access a bandwidth signature may also vary from embodiment to embodiment. For example, in one embodiment, a bandwidth signature may be accessible via an application programming interface (API) exposed via a library (or other module), while in another embodiment, a bandwidth signature may be placed in memory such that it is accessible directly by threads (or other application code).

Measuring an Application's Bandwidth Signature

In some embodiments, it may not be sufficient to just observe where memory is allocated as a relatively small piece of memory may be accessed frequently while a larger piece of memory may be seldom accessed. Additionally, it not be sufficient to just measure the bandwidth requirements of a single thread in a single location and assume that the pattern of accesses it displays will not change as the threads position changes.

Figure 7:
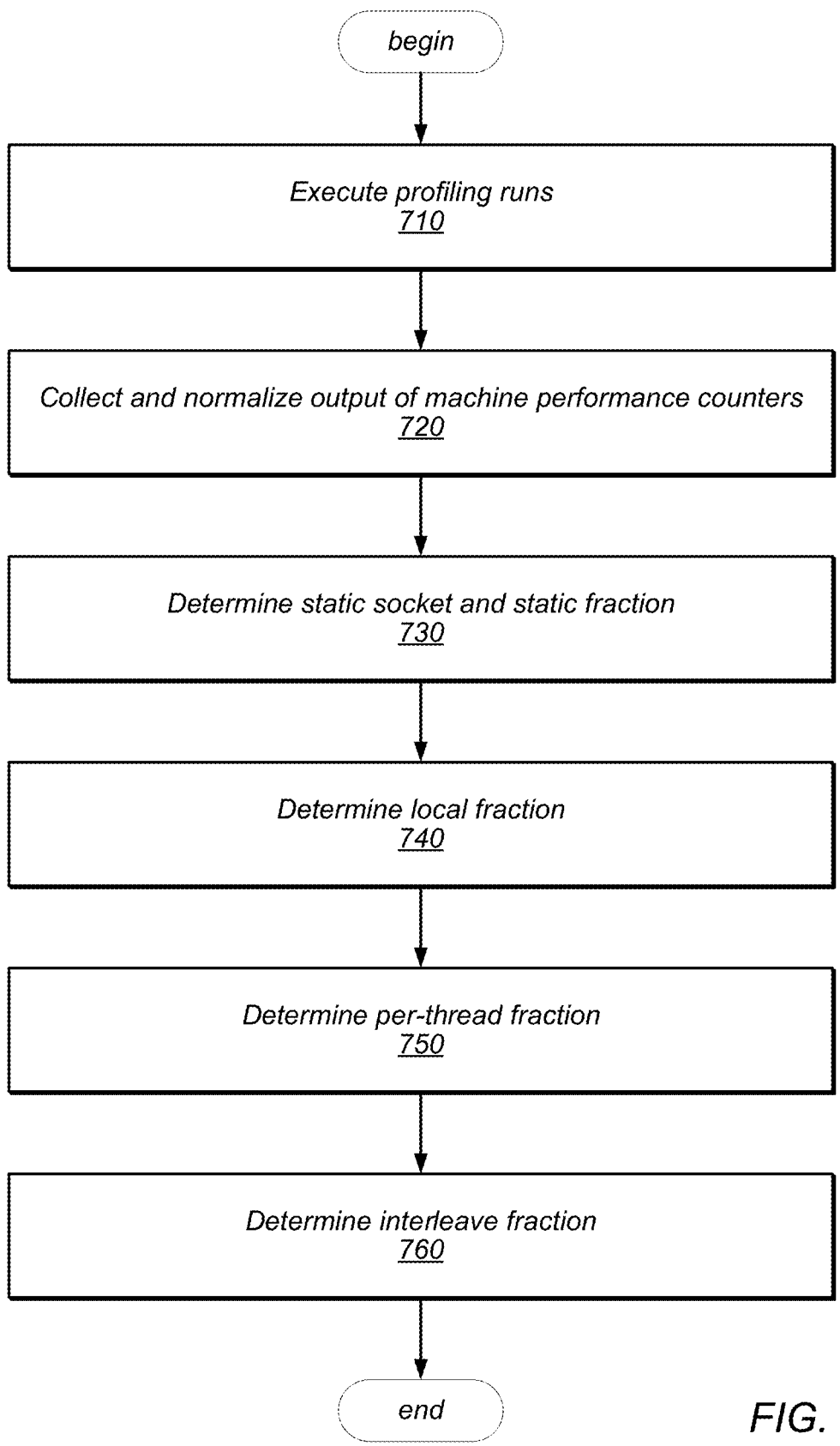
FIG. 7 is a flowchart illustrating one embodiment of a method for modeling memory bandwidth patterns, as described herein.

Turning now to FIG. 7, which is a flowchart illustrating one embodiment of a method for modeling memory bandwidth patterns, as described herein. As illustrated by block 710, a bandwidth modeler 110 may be configured to execute one or more profiling runs, according to one embodiment.

The techniques to calculate bandwidth signature can be applied to differing numbers of sockets in different embodiments, but are described for clarity herein using just 2 sockets. To calculate a bandwidth signature, performance counters may be utilized that, for the memory attached to each socket, may report the volume of data sent to and from the local CPU as well as the volume of data sent to and from remote CPUs. Alternatively, in some embodiments, the performance counters may report the volume of data sent and/or received from the perspective of the memory banks. Using these performance counters data may be collected from 2 profiling runs of a workload, according to one embodiment. The number of performance counters used, as well as the number of profiling runs may vary from embodiment to embodiment.

Figure 8A:
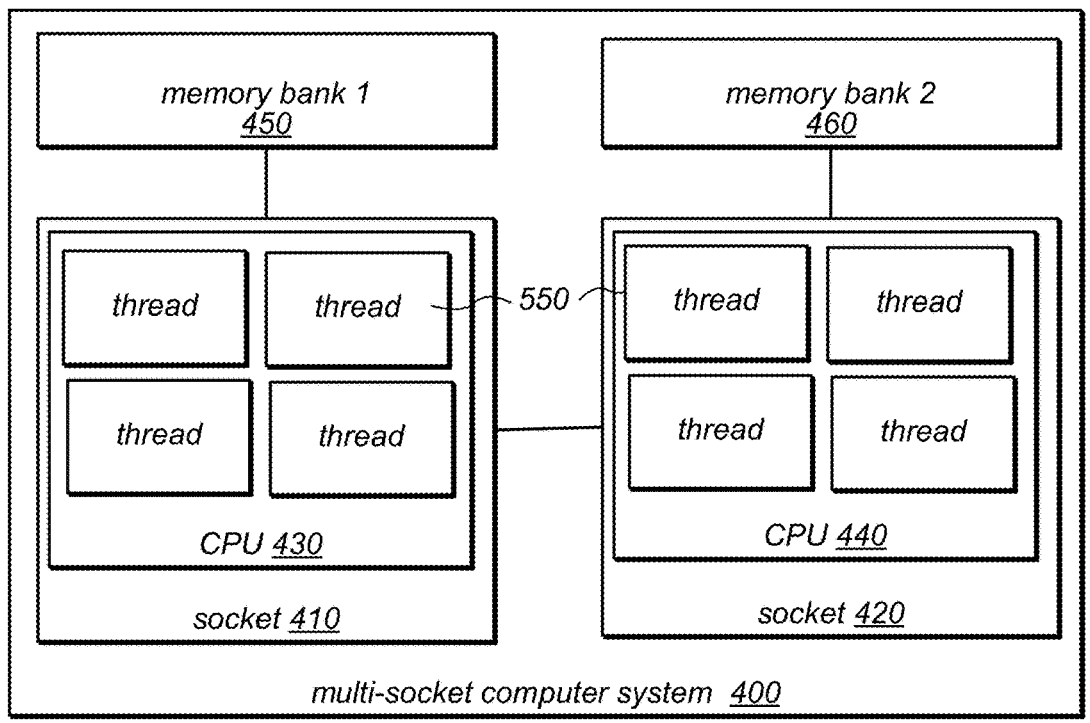
FIG. 8A-B is a logical block diagram illustrating two example placements used to determine the types of memory accesses performed by an application on a 2 socket machine with 6 cores per socket, according to one embodiment.
Figure 8B:
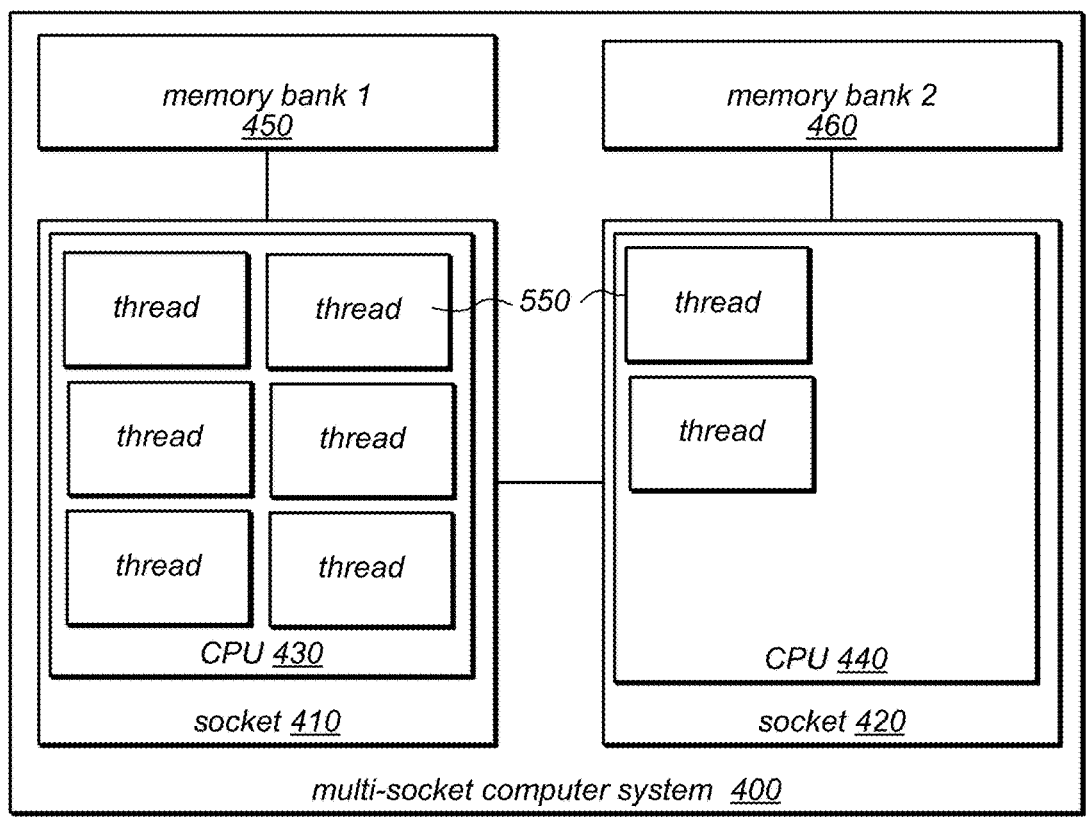

According to one embodiment, a first benchmarking/profiling run may be considered a job with an even number of threads where every thread has its own core, and both sockets have the same thread count. In this placement some cores are left unused to leave space to allow the asymmetric placement to use the same number of threads while maintaining the 1 thread per core policy. The second run may be an additional run which uses the same single thread per used core, but no longer has the same number of threads on each socket. An example of these placements can be seen in FIG. 8A-B. FIG. 8A-B is a logical block diagram illustrating two example placements used to determine the types of memory accesses performed by an application on a 2 socket machine with 6 cores per socket, according to one embodiment.

Depending on the choice of performance counters, 2 runs may be considered the minimum number from which sufficient data points can be measured to calculate all 8 properties of a bandwidth signature (e.g., (3 for reads describing the mix different access patterns, 3 for writes describing the mix of different access patterns, 1 for reads configuring the static access pattern and 1 for writes configuring the static access pattern). While the values for the profiling could be calculated with many different placements the choice to use a symmetric placement for the first run may be considered to greatly simplify the process. For example, the interleaved and per thread access patterns may become identical when the number of threads on each socket is equal, and the thread local accesses may place an equal load on each memory bank, according to one embodiment. Additionally, symmetric profile runs where the symmetry in the loads is not present may also be used to detect applications that may not fit the model well, according to one embodiment.

To keep profiling times to a minimum it is interesting to note that it may only be necessary to execute a profiling workload until a stable state is achieved and the program counters can be read, not necessarily until completion of the complete profiling workload. In addition, when the use of a bandwidth signature, as described herein, is combined with other performance prediction tools, a suitable symmetric run may already appear in the existing runs used by the tool, so the asymmetric run is the only additional run required, according to various embodiments.

Data Normalization

Returning to FIG. 7, bandwidth modeler 110 may also collect and normalize output of one or more machine performance counters, as illustrated by block 720. After completing the benchmarking runs, the output from the performance counters may be converted into normalized data. To do this for each memory bank the remote reads, the remote writes, the local reads, and the local writes may be calculated. Each of these may then be divided by the average number of instructions executed by the threads on the socket to which or from which that traffic was sent. This may be important as even on relatively simple workloads there can be a significant variation in execution rate between sockets. The resulting output is the data per instruction sent or received by each memory bank to each socket. An example can be seen in FIG. 9, which illustrates, two graphs showing an example of data recording by performance counters as well as the change to this data after normalization, according to one example embodiment.

Thus, in some embodiments, data normalization may include normalizing one or more values of the machine performance counters, which may in tern include one or more of: dividing a total amount of data accessed via local reads for a respective socket by an average number of instructions executed by threads executing on the respective socket; dividing a total amount of data accessed via remote reads for a respective socket by an average number of instructions executed by threads executing on the respective socket; dividing a total amount of data accessed via local writes for a respective socket by a total number of instructions executed by threads executing on the respective socket; and/or dividing an average amount of data accessed via remote writes for a respective socket by an average number of instructions executed by threads executing on the respective socket.

The first step is to normalize the data rate per socket relative to the rate of instructions being executed on the socket. This is required because even on relatively simple workloads there can be a significant variation in execution rate of threads on different sockets. This can be caused by a number of issues including, different latency times on memory accesses, and different available bandwidths to memory banks. By way of example on some lower spec processors the QuickPath Interconnect (QPI) between sockets can be saturate by a single thread, yet to run both the symmetric and asymmetric placements using the same thread count at least 2 threads per socket may be needed for the symmetric placement, according to some embodiments.

These differing rates of execution can make the raw counter output unrepresentative of the per thread memory access patterns. For example, if the symmetric placement is running and the threads are performing ¾ their accesses locally and ¼ their accesses remotely. If all the threads are running at the same speed then both memory banks may report that ¾ their accesses are local and ¼ are remote, and they each have returned the same amount of data. However, if the threads on the second socket are running at half the speed of the threads on the first socket then the ratios change so that 6/7 of the accesses to bank 1 and 6/10 of the accesses to bank 2 may be local. What's more, bank 1 only gets ⅞ and bank 2 gets ⅝ of the traffic they would have received if the threads ran at full speed.

To overcome this bandwidth modeler 110 may also be configured to first normalize the data transfer counters to the rate that the threads are executing at a per socket granularity. The resulting output is the data sent or received per instruction per memory bank from each socket.

Figure 9:
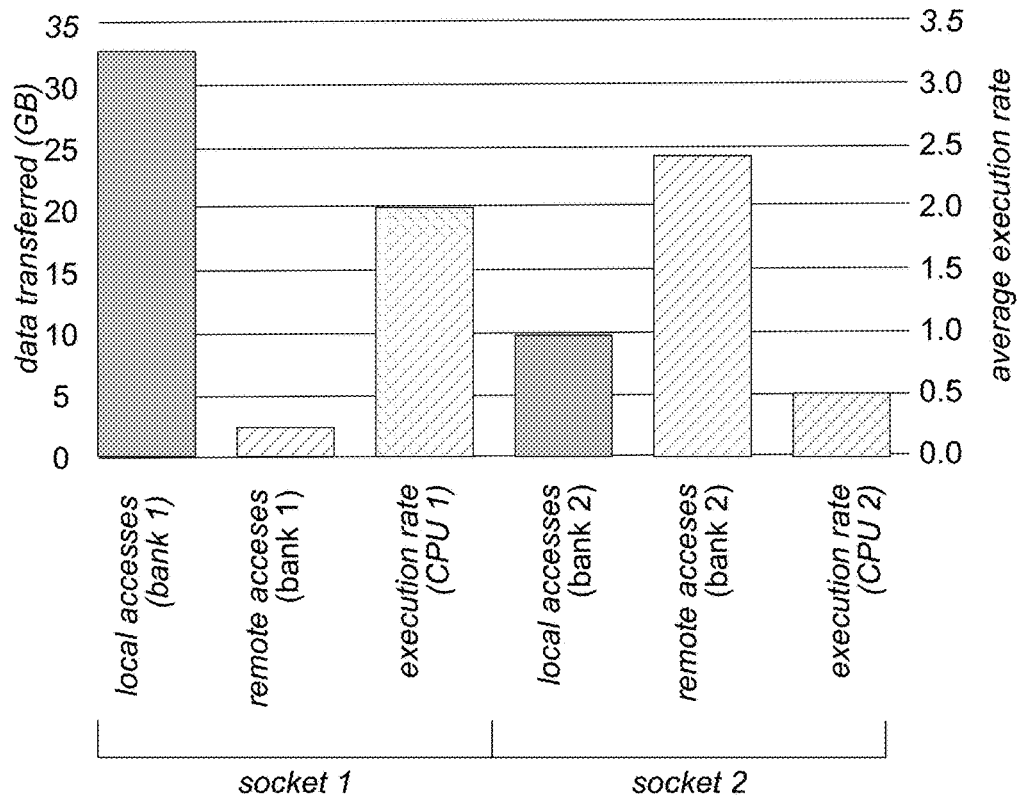
FIG. 9 is a graph illustrating an example of data recorded by performance counters before and after data normalization, according to one embodiment.
Figure 9:
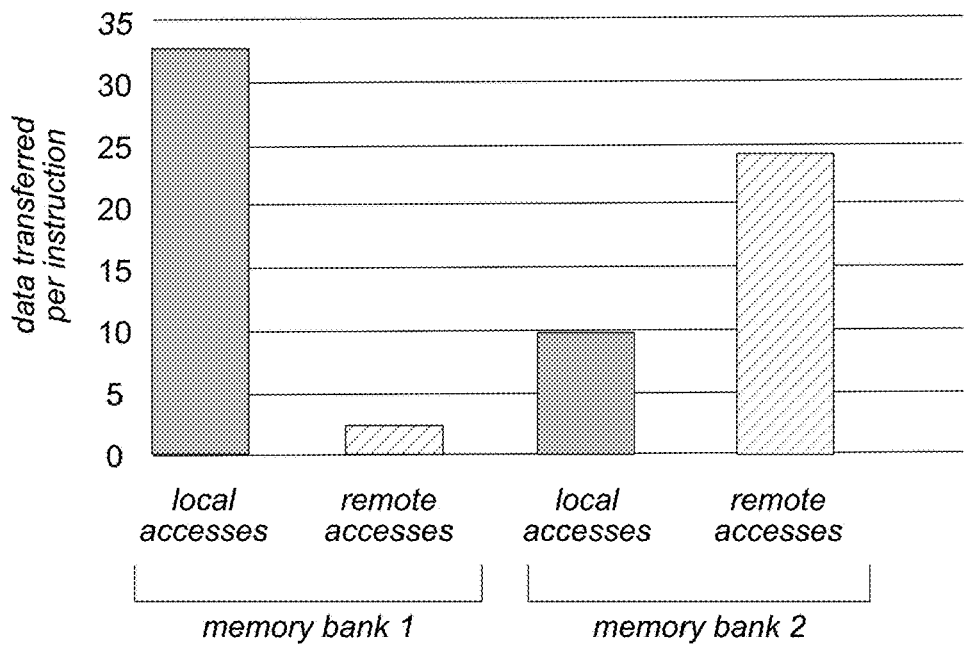

An example can be seen in FIG. 9. To do this for each memory bank, in some embodiments bandwidth modeler 110 may be configured to record the remote reads, the remote writes, the local reads, and the local writes. Each of these may then be divided by the average number of instructions executed by the threads on the socket that that traffic was to or from.

Static Fraction

Figure 10:
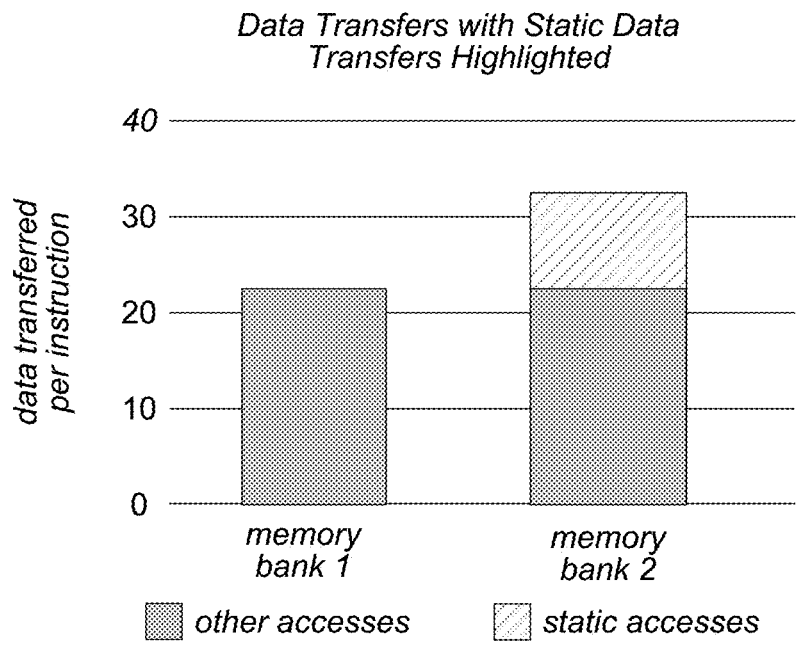
FIG. 10 is a graph illustrating total bandwidth per socket, with data associated with accesses to static allocations highlighted, according to one embodiment.

Returning to FIG. 7, bandwidth modeler 110 may then determine the static socket and a static fraction representing according to one embodiment, a percentage of data transferred to/from memory allocated in a single memory bank used by all threads, as in block 730. After normalizing the data transfers (d) the first properties calculated for the job description are the static socket, and the static fraction, according to one embodiment. To calculate these the normalized results generated by the symmetric profiling run may be used. For each memory bank the local and remote reads or writes may be summed to generate the total normalized reads or writes to the memory bank. For example, $d_{reads\ 1} = d_{local\ reads\ 1} + d_{remote\ reads\ 1}$. From these the socket with which the static fraction is associated may be calculated by observing which memory bank has the largest volume of data. For instance, in the example discussed above regarding FIG. 9 this may be socket 2 as shown by the static accesses portion of the graph in FIG. 10. In some embodiments, execution may be measured from the perspective of the CPU while memory accesses may be from the perspective of the memory bank.

Having determined the static socket bandwidth modeler 110 may next calculate the static fraction based on the normalized data. To do this bandwidth modeler 110 may calculate the additional data transfer on the static socket relative to the other sockets and divide this additional transfer by the total transfer used by the workload. This may result in the fraction of the transfer that was for data statically allocated to a single socket, and there in the fraction of the bandwidth that will be to the static socket for each thread.

$$\text{static faction} = \frac{d_2 - d_1}{d_1 + d_2}$$

In this example, this works out as 0.2 or 20%.

Local Fraction

Returning to FIG. 7, as illustrated by block 740 bandwidth modeler 110 may also determine a local fraction representing, according to one embodiment, a percentage of data transferred to/from memory by threads on the same socket as which the memory is allocated. To calculate the fraction of data transfers due to accesses to thread local data bandwidth modeler 110 may remove the data transfer due to the static fraction. Continuing the above example, this is just a case of deducting half the bandwidth associated with the static fraction from bank 2's remote accesses and half from its local accesses.

This leaves the accesses to data shared between sockets, made up of per thread data and interleaved data, and the accesses to data that is only used by threads on a given socket, local data, according to some embodiments. For each socket bandwidth modeler 110 may calculate the fraction of accesses that are remote.

$$r_i = \frac{remote\ accesses_{bank_j}}{remote\ accesses_{bank_j} + local\ accesses_{bank_j}}$$

For the symmetric pattern, Interleaved and Per-thread accesses may be indistinguishable, according to some embodiments. Thus, in some embodiments, bandwidth modeler 110 may be configured to deduce that if there were no accesses to local memory allocations, for s sockets the fraction of remote accesses may be expected to be $$r = \frac{s-1}{s}.$$

Adding back in the possibility of a non-zero local fraction including scaling, such as to allow for the static fraction already removed from the bandwidths may give:

$$r = \frac{s-1}{s}\left(1 - \frac{\text{local fraction}}{(1 - \text{static fraction})}\right)$$

Figure 11:
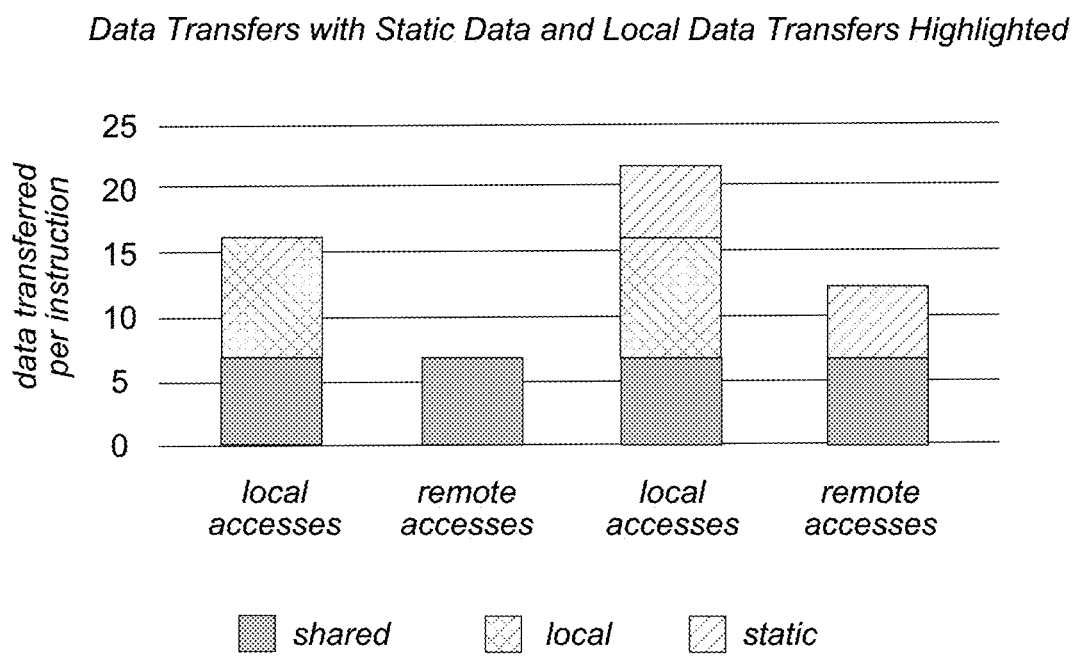
FIG. 11 is a graph illustrating remote and local accesses to memory banks on each socket, according to one embodiment.

This can be rearranged to get the local fraction, in some embodiments. Continuing the above example with the measured value of r being 0.28125, with no bandwidth categorized as local memory accesses it would be expected that r=0.5, as s=2 in this example. From this bandwidth modeler 110 may calculate that the local fraction is 0.35. This split along with the static accesses can be seen in FIG. 11.

Per-Thread Fraction

Returning to FIG. 7, bandwidth modeler 110 may also be configured to determine a per-thread fraction representing, according to one embodiment, a percentage of data transferred to memory allocated by one thread, but used by all threads, as illustrated by block 750. As discussed above, on a symmetric placement per thread and interleaved accesses may be indistinguishable. To overcome this a run with an asymmetric placement may be used to calculate this value. For the worked example the placement in FIG. 8B may be used according to some embodiments. Taking the results for this new placement, the bandwidths may be summed for each CPU, as in the following example:

$$c_{reads\ 1} = d_{local\ reads\ 1} + d_{remote\ reads\ 2}$$

Next the static socket may be removed from the static fraction of the bandwidth. In the example this may be done for reads as follows:

$$d'_{remote\ reads\ 2} = d_{remote\ reads\ 2} - \text{static fraction} \times (c_{reads\ 1})$$

$$d'_{local\ reads\ 2} = d_{local\ reads\ 2} - \text{static fraction} \times (c_{reads\ 2})$$

Additionally, the fraction of the local bandwidth associated with each memory bank may be removed. This may be done as follows:

$$d'_{local\ reads\ 1} = d_{local\ reads\ 1} - \text{local fraction} \times (c_{reads\ 1})$$

$$d'_{local\ reads\ 2} = d_{local\ reads\ 2} - \text{local fraction} \times (c_{reads\ 2})$$

Figure 12:
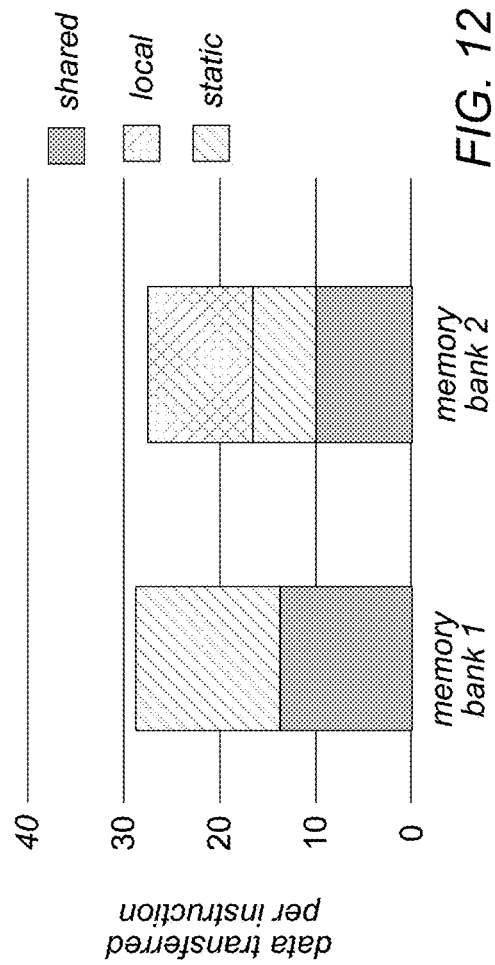
FIG. 12 is a graph illustrating normalized results for an asymmetric case with the static and local components calculated and removed from the computation of a per-thread fraction, according to one embodiment.

An example of this can be seen in FIG. 12, which is a graph illustrating normalized results for an asymmetric case with the static and local components calculated and removed from the computation of the per-thread fraction, according to one embodiment.

Having removed the already accounted for elements of the used bandwidth, the fraction of each CPU's bandwidth that is used for transfers to its local memory bank may be calculated.

This may be called the local fraction (l).

$$i \neq j$$

$$l = \frac{\text{local } accesses_{bank_i}}{\text{local } accesses_{bank_i} + \text{remote } accesses_{bank_j}}$$

In the worked example, these may be ⅔ and ⅓ for sockets 1 and 2 respectively, according to one example embodiment.

The expected local fraction if all the data is accessed on a per-thread bases may also be calculated. This value may be given by:

$$\text{per thread } data_i = \frac{n_i}{\sum_{j=1}^{s} n_j}$$

where $n_i$ is the number of threads on socket i and s is the number of sockets. Additionally, the expected local fraction, if all the data is interleaved, may be calculated:

$$\text{Interleaved}_i \frac{1}{s}$$

In the example, this provides fractions of ¾ and ¼ if all bandwidth is to per-thread data and ½ and ½ if all bandwidth is to Interleaved data. As the combination for a given application may, in some embodiments, be somewhere between these two points, bandwidth modeler 110 may interpolate between them, as in the following example:

$l_i$=per thread data$_i \times p$+interleaved data$_i \times (1-p)$

This equation may then be rearranged to get the value of p, in the example ⅔. p can then be scaled to get the per-thread fraction as follows:

per-thread fraction=$p \times$(1−local fraction−static fraction).

In this example case 0.3. The per-thread fraction is bounded between [0 . . . 1], such as to ensure that unusual data patterns cannot cause unexpected effects.

Referring now to block 760 of FIG. 7, bandwidth modeler 110 may also be configured to determine an interleave fraction representing, in one embodiment, a percentage of data transferred to memory allocated evenly across the sockets. For instance, the fraction of all accesses that are Per-thread shared, Local, and Static, may be determined. Any remaining bandwidth may be deemed to be Interleaved. As the sum of these fractions may be required to be <=1 according to some embodiments, bandwidth modeler may be configured to subtract the sum of the static, local and per-thread fractions from 1.0 to obtain the interleave fraction.

Integrating Bandwidth Signatures

A system configured to apply memory bandwidth patterns may generate a machine description based on executing stress applications and machine performance counters monitoring various performance indicators during execution of a synthetic workload. Such a system may also generate a workload description based on profiling sessions and the performance counters. Additionally, behavior of a workload with a proposed thread placement may be modeled based on the machine description and workload description and a prediction of the workload's resource demands and/or performance may be generated.

For instance, in some embodiments, a bandwidth modeler may be configured to utilize values (or other output) from one or more machine performance counters indicating one or more of: a number of local memory accesses performed by the workload, a number of remote memory accesses performed by the workload, a total number of instructions executed per-thread by the workload, and/or a total amount of time over which the total number of instructions were executed by the workload. Additionally, in some embodiments, values (or other output) of machine performance counters may include one or more of: an amount of data sent to and from a local CPU on which a particular thread of the workload is executing and/or and amount of data sent to and from one or more remote CPUs distinct from the local CPU.

From a series of profiling runs (e.g., 6 or more in some embodiments), a bandwidth modeler (or a system utilizing a bandwidth modeler) may be configured to quantitatively predict a workload's performance across different numbers of threads and different placements of those threads within a machine. The results can be used to predict thread allocation for a given workload and/or to predict the resources needed for a workload to meet a specified performance target. Thus, by utilizing the systems, methods and/or techniques described herein regarding Detection, Modelling and Prediction of Memory Access Patterns, the overall performance of system and/or of workloads executing on that system may be improved, such as due to better thread and/or memory allocation (e.g., placement). Such a system may, in some embodiments, exploit characteristics which are typical of in-memory parallel analytics workloads: there is a fixed amount of computation which can be distributed across a configurable number of threads. For instance, how a workload's fixed demand for resources maps onto the underlying machine may be controlled by varying the placement of these threads, according to some embodiments.

Figure 14:
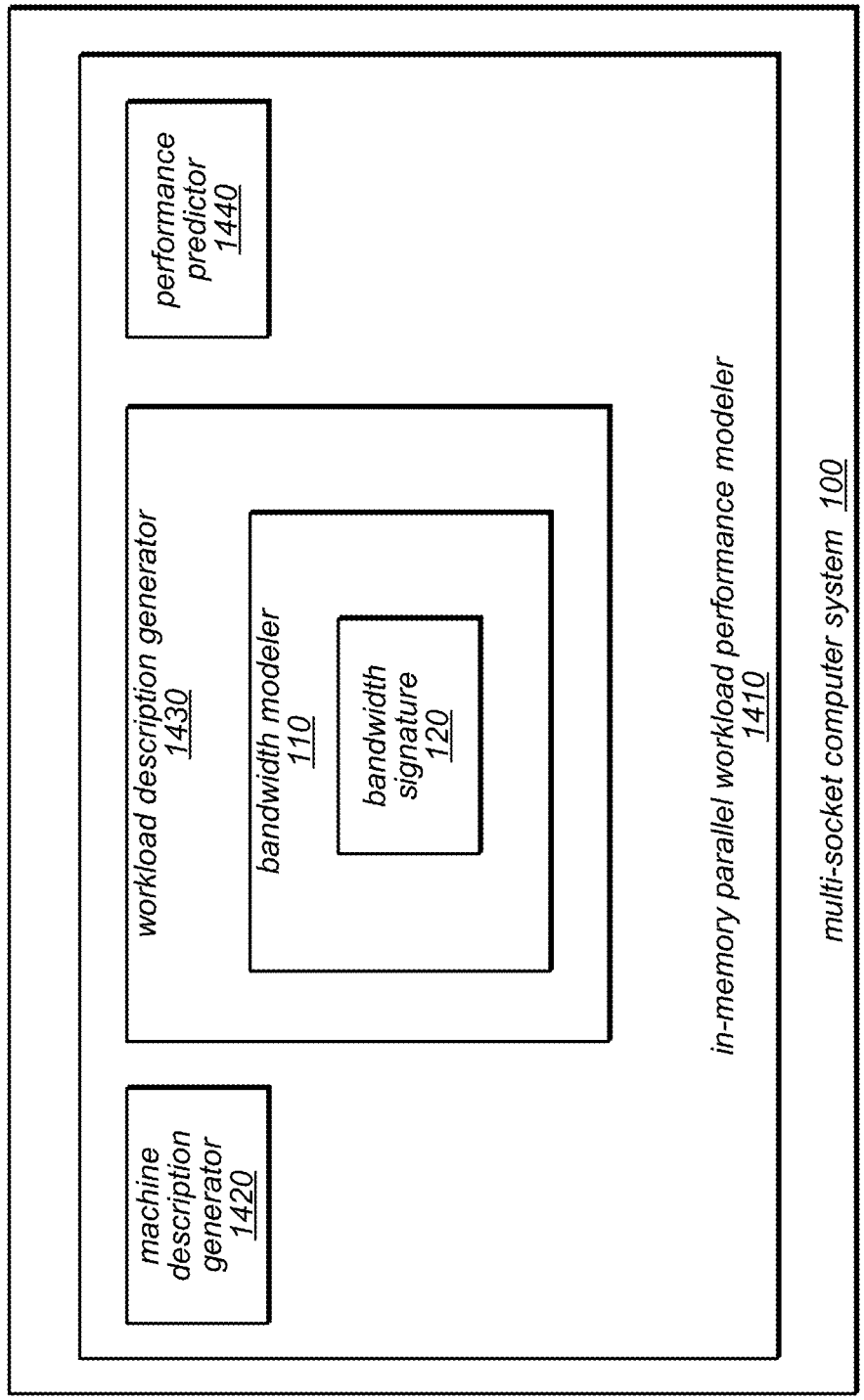
FIG. 14 is a logical block diagram illustrating a system configured to implement using a bandwidth signature for memory and/or thread placement, as described herein according to one embodiment.

A system configured to implement the systems, methods and/or techniques described herein may be described in terms of multiple components working together. For instance, the system illustrated in FIG. 14 includes three components, according to one embodiment. FIG. 14 is logical block diagram illustrating components and dependencies within a system configured to implement Detection, Modelling and Prediction of Memory Access Patterns, according to one embodiment. As illustrated in FIG. 14, a computer system 100, which may in some embodiments be a multi-core system or a multi-socket system, may include an in-memory parallel workload performance modeler 1410 configured to model the performance of in-memory parallel workloads with differing thread counts and placements. The in-memory parallel workload performance modeler 1410 may include, and/or utilize, various components when modeling workload performance, such as machine description generator 1420, workload description generator 130 and/or performance predictor 140, according to one embodiments. While illustrated in FIG. 14 as being a part of, or included within, in-memory parallel workload performance modeler 1410, in some embodiments, machine description generator 1420, workload description generator 1430 and/or performance predictor 1440 may be separate, distinct and/or external to, in-memory parallel workload performance modeler 1410.

In some embodiments, computer system 100 may be configured to implement a method for Detection, Modeling and Application of Memory Bandwidth Patterns including, for example, generating a machine description for a system (e.g., a multi-core or multi-socket system) based on executing one or more stress applications on the system and values of one or more machine performance counters configured to monitor one or more performance indicators during execution of a synthetic workload on the system. Such method may also include generating a workload description for the system based on results from executing multiple profiling session on the system and the values of the one or more machine performance counters. Additionally, computer system 100 may be configured to model behavior of a workload with a proposed thread placement based on the machine description and the workload description. Based on results of modeling the workload behavior, computer system 100 may generate a prediction of the workload's resource demands and performance for the system.

The components illustrated in FIG. 14 may be summarized as follows:

Machine description generator. This may be considered a collection of synthetic applications designed to saturate different resources in the machine. The system in FIG. 14 may be configured to measure the performance of these applications with hardware counters. Measurements from the hardware counters may be used to determine the structure of the machine, and properties such as the maximum bandwidth at different levels of the memory hierarchy, according to some embodiments. The results may be, or may be used to determine, a machine description, such as for use in subsequent modeling steps.

Workload description generator. Additionally, the system of FIG. 14 may execute a workload in multiple profiling runs. In some embodiments, these profiling runs may be specifically selected and/or designed in order to provide more accurate data or to simplify performance modelling. These profiling runs may record results including, in some embodiments, CPU performance counters for (i) the workload's solo performance, (ii) the workload's scaling across resources, and (iii) when co-located with synthetic applications that impose carefully chosen stresses on the workload. In some embodiments, a workload description generator may include, or may utilize, a bandwidth modeler or other utility configure to implement Detection, Modelling and Prediction of Memory Access Patterns, as described herein. While described herein mainly as part of a larger system for modeling performance and resource demands, a bandwidth modeler may also be implemented as a standalone system, application and/or program, according to various embodiments.

Performance predictor Finally, the system of FIG. 14 may take a machine description, a workload description, and a proposed thread placement and from these provide a prediction of the workload's resource demands and performance.

Detection, Modeling and Application of Memory Bandwidth Patterns is described herein mainly using examples from in-memory graph analytics, in-memory parallel join operations (database kernels), along with traditional parallel computing workloads such as those using the OpenMP runtime system or other parallel runtime systems. For brevity, these may be referred to herein as "analytics workloads". In some embodiments, performance of analytics workloads may be determined primarily by the processor(s) and the memory system. For instance, data may remain in memory and there may be little use of I/O devices or system calls into the operating system. Furthermore, the number of active threads may be selected to optimize performance (in contrast, say, to a general-purpose workload where a program may create distinct threads for distinct tasks).

For example, manual configuration may frequently be used, such as to select the number of threads to create and/or to determine how to place them in the machine. For instance, in one example embodiment using OpenMPTM, there are settings to select whether threads are placed on nearby cores or distributed across many cores. Similarly, Solaris provides "thread affinity groups" to allow a program to indicate these kinds of preference with a high degree of flexibility. These features may allow a workload to control its scheduling, but may not automate the selection of a good scheduling policy.

Additionally, workloads may be selected which will perform either well or poorly when sharing these specific resources within a machine. These techniques may be useful when deciding when to co-locate workloads, however, the techniques described herein may apply to the threads within a single workload (such as threads handling part of the same parallel query within a server system), according to some embodiments.

As noted above, a system configured to implement Detection, Modelling and Application of Memory Bandwidth Patterns, which may be referred to herein as "the system", may generate a description of a workload from multiple, (e.g., 7) profiling runs, and may combine this workload description with a description of the machine's hardware to model the workload's performance over thousands of alternative thread placements, according to one embodiment. The techniques described herein may be considered "comprehensive" in that they may account for contention of multiple different resources within the machine, such as both processor functional units and memory channels. For example, the point of contention for a single workload may shift between resources as the degree of parallelism and thread placement changes. The techniques described herein may account for these changes and may provide a close correspondence between predicted performance and actual performance.

Figure 15:
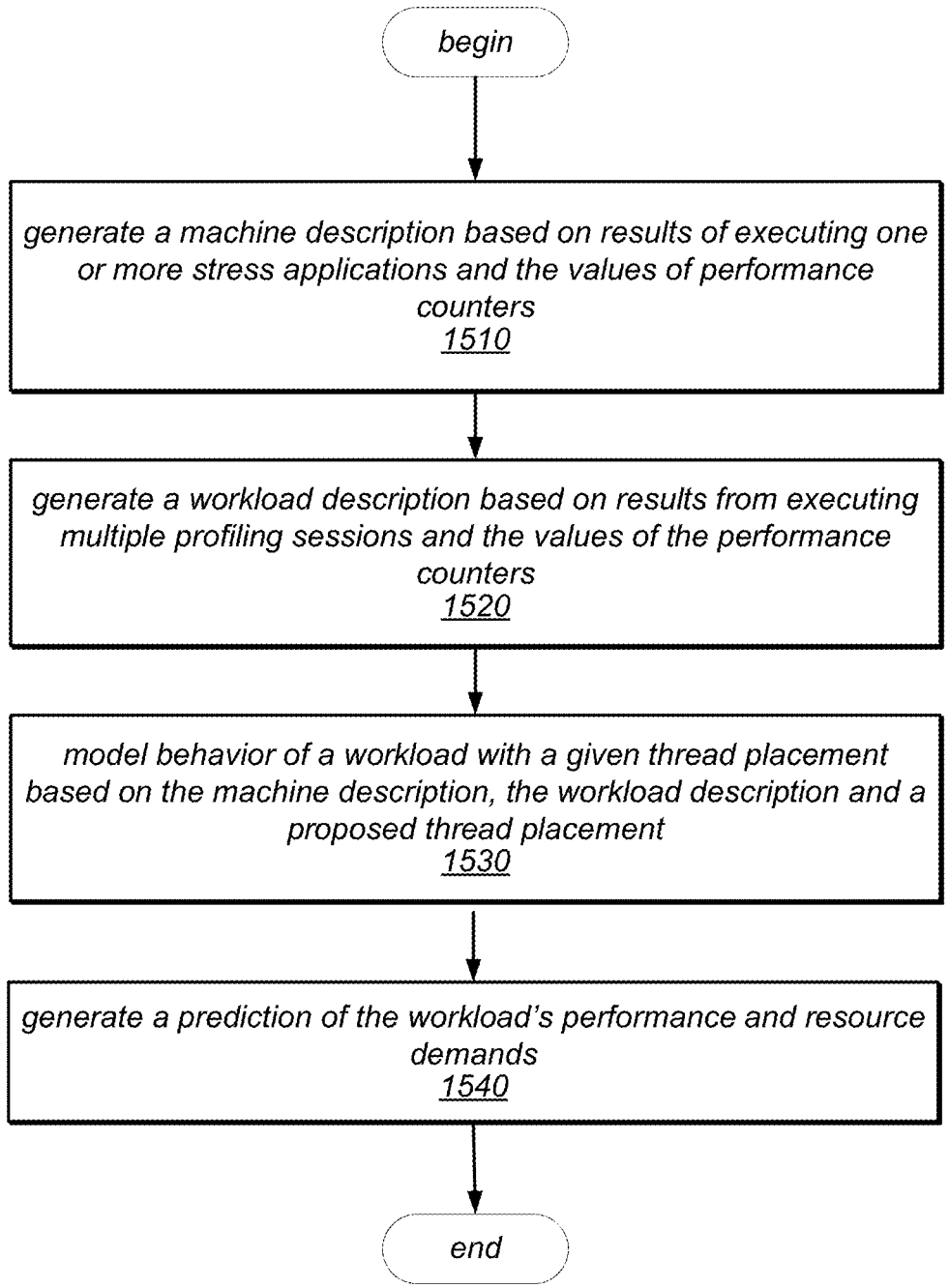
FIG. 15 is a flowchart illustrating one embodiment of a method for Detection, Modeling and Application of Memory Bandwidth Patterns, as described herein.

As noted above, computer system 100 may generate a machine description, generate a description of a workload, and from these model the performance of a given thread placement. FIG. 15 is a flowchart illustrating one embodiment of a method for implementing Detection, Modeling and Application of Memory Bandwidth Patterns as described herein. In some embodiments, computer system 100 and/or machine description generator 1420 may include and/or rely on one or more stress applications, such as one or more test applications that stress the use of different resources in the machines. For instance, as illustrated by block 1510, machine description generator 1420 may generate a machine description based, at least in part, on results of executing one or more stress applications and/or the values of one or more performance counters. For example, in some embodiments machine description generator 1420 may be, or may be considered, a collection of stress applications (e.g., one or more test applications that stress the use of different resources in the machines), that in conjunction with one or more machine performance counters may determine the structure and properties of the machine they are running on. The results of these queries may be combined into a machine description which may be used by other components.

Additionally, a workload description generator 1430 may generate a workload description based, at least in part, on results from executing multiple profiling sessions and on the performance counter values, as shown in block 1520. For instance, workload description generator 130 may execute a workload in multiple (e.g., 7 in some embodiments) profiling experiments during which performance counters may be monitored and the workload may be collocated with stress applications. Thereafter, a workload description may be generated modelling the particular workload.

Furthermore, a performance predictor 1440 may model behavior of a workload with a given thread placement based, at least in part, on the machine description, the workload description and a proposed thread placement, as in block 1530. For example, performance predictor 140 may utilize the previously generated machine description, workload description, and a proposed thread placement and model the behavior of the workload with the given thread placement. The performance predictor 1440 may then proceed to generate a prediction of the workload's performance and resource demands, as in block 1540.

In some embodiments, an initial assumption (possibly a naive assumption) for a given thread placement may be used in which each thread in the parallel workload will impose the same load on the machine as a single thread from a profiling run. This load may, in some embodiments, then be iteratively refined by (i) identifying any bottleneck resources for each thread, scaling back the thread's performance accordingly, and (ii) predicting any overheads incurred by communication and synchronization, scaling back the thread's execution rate to account for these costs. Note that in some embodiments, there may be complex interactions between the demands for different resources. The load may be iteratively refined until a fixed point is reached, according to some embodiments.

The techniques described herein may also be utilized to predict performance of parallel workloads on shared-memory multi-core and/or multi-socket machines. A system configured to implement the techniques described herein may identify a set of hardware and software assumptions which permit performance predictions to be made without requiring detailed models of how the cache is implemented, or how threads will compete within it, as opposed to generating miss-rate curves, according to some embodiments. In addition, the techniques described herein may include techniques for predicting performances based on iteratively predicting the slowdowns that a workload will experience due to contention-based and/or synchronization-based overheads, according to some embodiments.

In some embodiments, the distribution of each thread's bandwidth across the components described in the machine description is fixed. So while it may be possible to change the allocation pattern from just being allocated to the local memory bank, to being allocated evenly across all the memory banks, this may still apply the same allocation strategy to all workloads. This can lead to issues related to resource limitations being incorrectly predicted in some embodiments. Such a situation may be expected to get worse when co-scheduling multiple workloads as other parameters in a single workload may be able to mask the error, but such masking may would work with independently constructed parameters, according to some embodiments. For example, if workload A under-specifies its required bandwidth on a link, this may be hidden by the calculated latency sensitivity. However if workload B is trying to calculate its slowdown in the presence of workload A, its latency sensitivity would not include a correction for the error introduced when measuring A.

Figure 16:
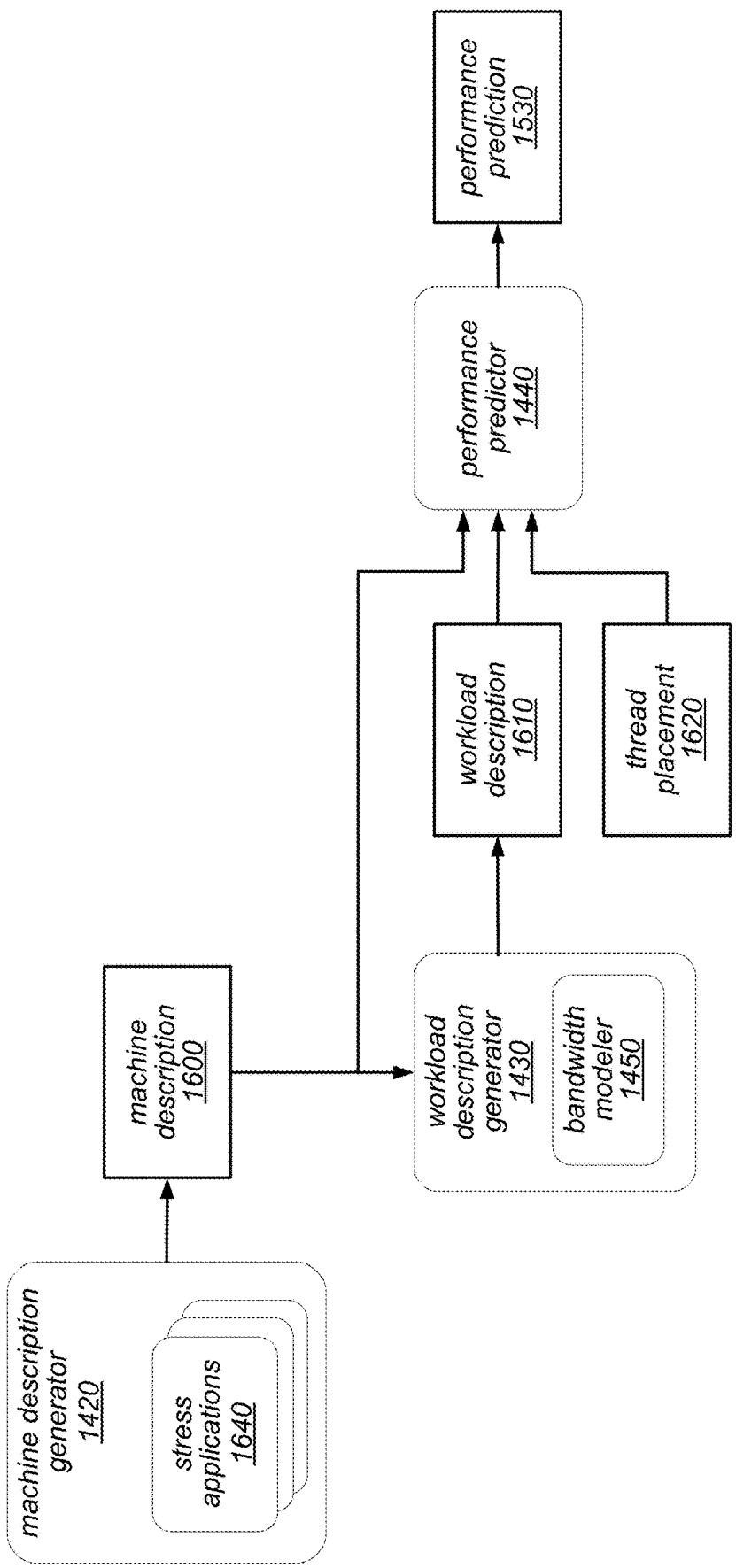
FIG. 16 is a logical block diagram illustrating three components that make up a system configured to implement Detection, Modeling and Application of Memory Bandwidth Patterns and the dependencies linking them, according to one embodiment.

FIG. 16 is a logical block diagram illustrating various components that may be included as part of a system configured to implement Detection, Modeling and Application of Memory Bandwidth Patterns as well as data flow and/or dependencies that link them, according to one embodiment.

For instance, machine description generator 1420 may be, or include, a collection of stress applications 1640. Machine description generator 1420 may utilize the stress application in conjunction with machine performance counters to determine structure and properties of a machine on which they are executing. The results of these queries may be combined into a machine description 1600 which may be used by other components. Machine descriptions may be created once for each machine, and may be independent of the workload being scheduled, according to various embodiments.

Thus, a machine description 1600 may be constructed through a combination of information obtained from the operating system (OS), and measurements taken from the performance of synthetic applications, such as stress applications 1640. Stress applications 1640 may be configured (e.g., either individually or collectively) to stress particular resources of the system. In some embodiments, the OS may provide various types of information, such as the number of processor sockets, cores per socket and hardware threads per core as well as the structure of links between each level in the cache hierarchy, the topology of the interconnect between the sockets, and/or locations of links to main memory. The OS-provided information may then be combined with performance measurements from the stress applications, such as describing the bandwidth of different links in the memory system as well as the performance of the cores, to generate the machine description 1600, according to some embodiments. Additionally, in some embodiments rather than being measured (e.g., by the one or more stress applications) the performance measurements may be provided by the OS (e.g., along with the topology of the machine) or they may be configured manually for the machine.

Workload description generator 1430 may execute a workload in multiple (e.g., 6 in some embodiments) profiling experiments. During profile experiments, performance counters may be monitored and the workload may be collocated with stress applications. A workload description 1610 modelling the particular workload may then be generated. In some embodiments, information required to model a given workload may be collected and encoded in workload description 1610. Workload description 1610 may be specific to a given workload on a given machine and thus may be regenerated when moving a workload to different hardware.

In some embodiments, workload description generator 1430 may include, or may utilize, a bandwidth modeler 1450, which may be configured to implement Detection, Modeling and Application of Memory Bandwidth Patterns as described herein. While illustrated in FIG. 16 as being within and/or part of workload description generator 1430, in some embodiments, bandwidth modeler 1450 be separate from, yet utilized by, workload description generator 1430. whether implemented as part or separate from workload description generator 1430, bandwidth modeler 1450 may be configured to model the memory access patterns of a multi-core system based on one or more profiling runs. In addition bandwidth modeler 1450 may also generate a bandwidth model utilizing one or more bandwidth classes. For instance, in one embodiment bandwidth modeler 1450 may determine the relative amounts of bandwidth (e.g., memory accesses) that correspond to different types or classes of bandwidth. In some embodiments, bandwidth modeler 1450 may the same as, or may perform the same functions as, bandwidth modeler 110.

Thus, in some embodiments, bandwidth modeler 1450 may be configured to determine, based at least in part on values obtained from one or more hardware performance counters, a static fraction, a local fraction, a per-thread fraction and/or am interleaved fraction. As described herein, a static fraction may represent the relative amount of the total memory accesses that corresponding to static memory accesses, a local fraction may represent the relative amount of the total memory accesses corresponding to local memory accesses, a per-thread fraction may represent a relative amount of the total memory accesses corresponding to per-thread memory accesses and a per-thread fraction may represent a relative amount of the total memory accesses corresponding to per-thread memory accesses, according to various embodiments.

Performance predictor 1440 may take machine description 1600, workload description 410, and a proposed thread placement 1620 and may use them to model the behavior of the workload with the given thread placement, and provide a performance prediction 1630 of the workload's resource demands and performance. In some embodiments, performance prediction 430 may be constructed from a combination of an anticipated speed-up assuming perfect scaling of parallel sections of the workload and a slowdown reflecting the impact of resource contention and synchronization. Performance predictor 1440 may proceed iteratively until reaching stable prediction.

In some embodiments, the aspects of a modeled workload may be split into multiple groups, including, but not limited to, resource demands, parallel fraction, inter-socket latency, load balancing factors, core burstiness, and/or thread utilization, as summarized below.

Resource demands. The hardware resources expected to be consumed by threads may be modeled. These resources may include bandwidths at each level of the memory hierarchy as well as the compute resources within a core.

Parallel fraction. How the workload is expected to scale (e.g., an expected workload scaling) with a thread count of n in the absence of other constraints may also be modeled. This scaling may, in some embodiments, be provided by Amdahl's law, such as based on the notion that some fraction of the execution p is parallel and the rest is serial:

$$Speedup = \frac{1}{(1-p) + \frac{p}{n}}$$

Inter-socket latency. Bandwidth consumed by inter-socket communication may be recorded as part of the resource demands, but latency introduced by inter-socket communication may also be modeled. When threads access shared memory locations the performance may depend on the relative locations of the threads, if atomic operations are used, if there is any sharing, and if so what kind, such as false or genuine sharing. This variation may make it unfeasible, in some embodiments, to model the detailed interactions at the hardware level.

These effects may be measured in aggregate for a workload by determining the workload's sensitivity to having its threads placed on different sockets. This may capture the sensitivity of the workload it is to such costs, and the actual latencies introduced by the hardware, according to some embodiments. For instance, if threads communicate rarely the values may remain low even if the hardware introduces high latencies between sockets, according to some embodiments.

Load balancing factor. In cases where threads are not placed symmetrically it may be important to determine the effect on the overall speed of a workload if some threads slow down more than others. For example, some workloads may use static work distribution in which if a slow thread becomes a straggler, it may delay completion of the complete workload. In such a case each thread may perform an equal amount of work, but the time individual threads spend performing the work may differ. Other workloads may use work stealing to distribute work dynamically between threads, possibly allowing any slowness by one thread to be compensated for by other threads picking up its work. In this case the overall performance of the workload may be determined by the aggregate throughput of all of its threads as threads may be active for the same amount of time, but some threads may be making progress more quickly than others. In practice, workloads may be somewhere between these points. In some embodiments, this may be expressed by a load balancing factor indicating where a workload lies between these extremes.

Core burstiness. Core burstiness may quantify the extent to which the workload's demands for resources in a core may be spread over time (e.g., from being spread evenly over time or occurring in synchronized bursts), according to some embodiments. Synchronized bursts may coincide when threads are collocated, possibly producing additional resource contention. Thus, it may be misleading to rely on simple average demands captured over a time, as a low average may reflect a steady demand which may be accommodated from multiple threads without penalty, or it could reflect coinciding peaks and troughs.

Thread utilization. If applications fail to scale perfectly (such as due to sequential sections, or waiting on slower threads and communication) then resource demands for threads may be reduced accordingly, according to some embodiments. Likewise, if a thread is waiting on resources (or waiting on other threads), some latency may be hidden in time lost waiting for resources. Thus, in some embodiments, a thread utilization factor f usable to scale the requirements, may be introduced to accommodate this. A thread utilization factor may be calculated for each thread and be recomputed at each step during the model's execution, according to some embodiments.

Machine Description

According to various embodiments various pieces of information may be collected and encoded into a machine description modelling structure and/or performance of a machine. In some embodiments, machine descriptions may be created once for each machine and may be independent of the particular workload being scheduled.

A machine description, such as machine description 1600, may be constructed through a combination of information obtained from the operating system (OS) as well as measurements taken from performance of synthetic applications, such as stress applications 440, which may stress particular resources. For example, in one embodiment the OS may provide various types of information such as: the number of processor sockets, the number of cores per socket, and/or the number of hardware threads per core.

In some embodiments, a machine description may include information describing the structure of links between levels in the cache hierarchy, the topology of the interconnect between the sockets, and/or the locations of the links to main memory. For example, a machine description may include, and/or be represented as, a graph of the hardware components of the machine and the relationships between them. Additionally, this information may be combined with performance measurements describing bandwidth between and/or among the components. For instance, in some embodiments, a hardware description may include regarding performance of the different links in a memory system and/or performance of the cores. Thus, a machine description may include information identifying (and/or describing) multiple system components, information identifying (and/or describing) relationships between (and/or among) those components, and/or information identifying (and/or describing) performance (absolute or relative performance) along communication links and/or interconnects between the components.

Figure 17:
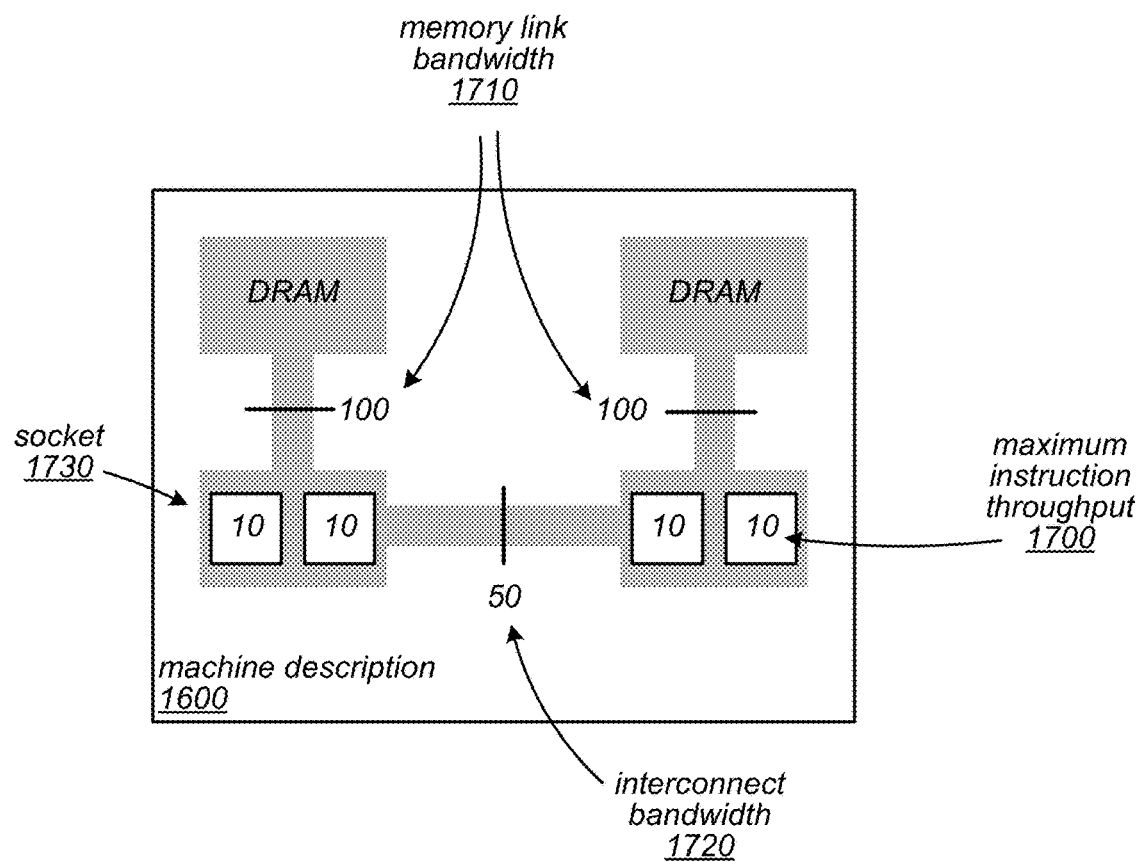
FIG. 17 is a logical block diagram illustrating an example machine model for a simple system comprising two dual-core processors and no caches, as in one embodiment.

FIG. 17 illustrates an example machine description 1600 for a system comprising two dual-core processors and no caches, according to one embodiment. While FIG. 17 illustrates a machine description graphically, the information illustrated in FIG. 17 may be represented in any of various manners, according to different embodiments. A machine description 1600 may indicate bandwidth 1710 on the memory links (e.g., 100), bandwidth 1720 on an interconnect between sockets 1730, along with the maximum instruction throughput 1700 per core, according to some embodiments. For instance, according to the example embodiment illustrated in FIG. 17, machine description 1600 indicates memory link bandwidth of 100, an interconnect bandwidth of 50, as well as maximum instruction throughputs per core of 10. Note that for brevity units are omitted. In general, since consistent units may be used when modeling a machine and workload, the exact scale may not be relevant, according to some embodiments.

Measuring Link Bandwidth

Starting from a machine topology, one or more stress applications 1640 may be executed, such as to determine the maximum bandwidth achieved on links in the memory system (e.g., between levels in the cache hierarchy or on interconnects between sockets). In some embodiments, results obtained from workloads running on the machine itself may be used for some or all of these measurements, rather than numbers obtained other sources, such as from data sheets. This empirical approach may allow the same measurement techniques to be used for profiling the machine and for profiling the performance of a workload, according to some embodiments.

In some embodiments, the implementation of the stress applications may be optimized to increase the consumption of the resource being stressed. For example, in one embodiment stress applications 1640 may allocate an array of a parameterizable size accessible linearly with a single value read and/or written per cache line with accesses in an unwound loop with constant arguments to allow for effective prefetching and branch prediction. When multiple threads are used, each thread may have a unique set of cache lines that it will access. In some embodiments, the size of the array may be chosen to almost fill the size of the component at the far end of the link, without spilling into the next level. For example, according to one embodiment an array allocated in main memory may be at least 100 times the size of the last level of cache. This may ensure that most (or almost all) of the accesses miss in the cache, even if the cache is adaptively holding a portion of the array. When placing in memory, tools such as numactl, may be used to ensure the correct placement of memory allocations, according to some embodiments.

When measuring the bandwidth of shared caches, it may be important to measure the maximum bandwidth of each link to the cache and the maximum cumulative bandwidth that the cache can sustain. For example, the L3 cache may not be able to support sufficient bandwidth for the maximum access rate from a core to be sustained to all cores simultaneously. So on an 18 core chip each core may achieve a peak bandwidth of 360, but the L3 cache as a whole may only provide 5000, according to some embodiments.

Measuring Core Performance

Maximum core performance may be measured by monitoring counters (e.g., performance counters) while executing a synthetic workload. The workload may perform operations on a sufficiently small dataset such that it fits into the L1 cache without incurring cache misses during execution, according to one embodiment. In some embodiments, pipeline stalls may be avoided by providing a large number of independent operations, and branch stalls may be reduced by unwinding the loop and using constant values on the loop guard to allow good prediction. The operations may be integer based to enable peak performance. There may be variation in peak performance based on the type of operation used. Additionally, in some embodiments, two threads may be executed on the core, such as to assess if the core suffers a loss in peak performance when co-scheduling multiple software threads on different hardware thread contexts provided by the core. Performance may be measured in instructions executed per unit time.

Workload Model

As noted above, a system configured to implement Detection, Modeling and Application of Memory Bandwidth Patterns may collect information to model a given workload. This information may be encoded in a workload description 1610. A workload description may be specific to a given workload on a given machine and may ideally be regenerated when moving to different hardware. However, predictions may remain useful across similar hardware platforms, according to some embodiments.

According to one embodiment, information about the workload's performance may be gathered by making multiple (e.g., 6 in some embodiments) test runs of the workload with different thread placements designed to elucidate particular details, such as for example, the sensitivity to having threads collocated on the same cores. Note that different factors may be inter-related, according to various embodiments.

In some embodiments, the workload model may be built up incrementally in multiple (e.g., 5) steps, with each step providing a successively more detailed description of the workload's behavior. The experimental runs may be organized so that the behavior being considered in a given step may depend (only) on factors already determined in preceding steps. For example, a step 2 may depend on step 1, while steps 3-5 may be independent of each other, but may depend on steps 1 and 2. In some embodiments, aside from a first step (e.g., step 1) these dependencies may exist only in the calculation of the model parameters—the actual experimental runs may proceed concurrently if multiple machines are available. Please note that while the various determinations and calculations described herein regarding generating a workload model represent merely one example according to one embodiment. The use of the term "step" is for ease of explanation only and is not meant to convey absolute or necessary divisions between the features described.

For example, the following table illustrates 5 example steps that may, in some embodiments, be used to generate a workload model. The following table also includes possible values for the steps for an example system illustrated in FIG. 17.

| Step | Property | Example Value |
|---|---|---|
| 1 | Single thread resource demands (d) - The single thread execution time $t_1$ and a vector of resource demands for that one thread | [7, 40] |
| 2 | Parallel fraction (p) - The fraction of the workload which runs in parallel | 0.9 |
| 3 | Inter-socket overhead ($0_s$) - the latency relative to $t_1$ for inter-socket communication when threads are placed on different sockets. | 0.1 |
| 4 | Load balancing factor (l) - The extent to which the workload can be re-balanced dynamically between threads based on their progress | 0.5 |
| 5 | Core burstiness (b) - The sensitivity to collocation of threads in a core | 0.5 |

Thread Utilization

If applications fail to scale perfectly, such as due to sequential sections, or waiting on slower threads and communication, then their execution time may increase while the total resources they will require may remain constant. This means the rate of resource consumption for threads may be reduced accordingly. Likewise, if a thread is waiting on other threads or on resources, then some latency may be hidden in the time lost waiting for resources. As noted above, a thread utilization factorfusable to scale requirements may be introduced in some embodiments to accommodate this. This thread utilization factor may be calculated for each thread at each step based on the results of the proceeding steps.

Figure 18:
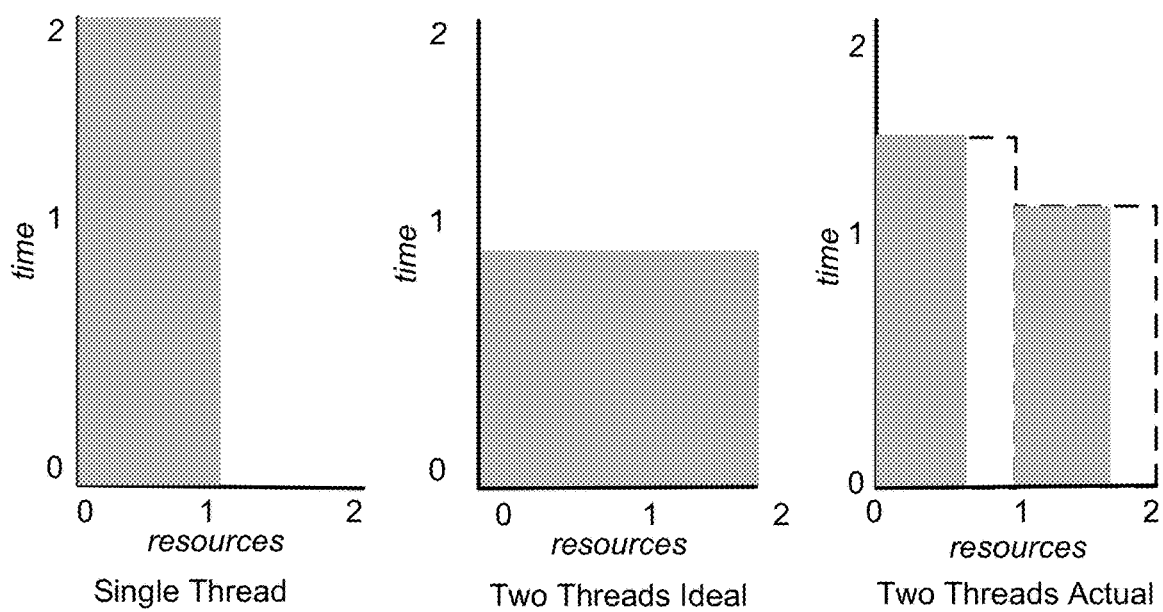
FIG. 18 illustrates examples of possible loadings when calculating thread utilization, according to some embodiments.

FIG. 18 illustrates examples of possible loadings when calculating thread utilization, according to some embodiments. The grey boxes show the resources used in each scenario and all have the same area, and the dashed box in the third graph shows the resources available. In the first graph 1 thread is executing, in the second graph, 2 threads are executing with ideal scaling and in the third graph, 2 threads are executing with non-ideal scaling. The dashed box represents the resources available and the gray box represents the actual resources used. The utilization factor is the ratio between these two.

In the calculations described herein, according to some embodiments, the thread utilization factor is recomputed at each step. The utilization factor f may be annotated as fx to identify the value at the start of step x. Thread utilization may be necessary, in some embodiments, to remove the scaling from values when generating the workload description as well as to add it when performing performance predictions.

Figure 19:
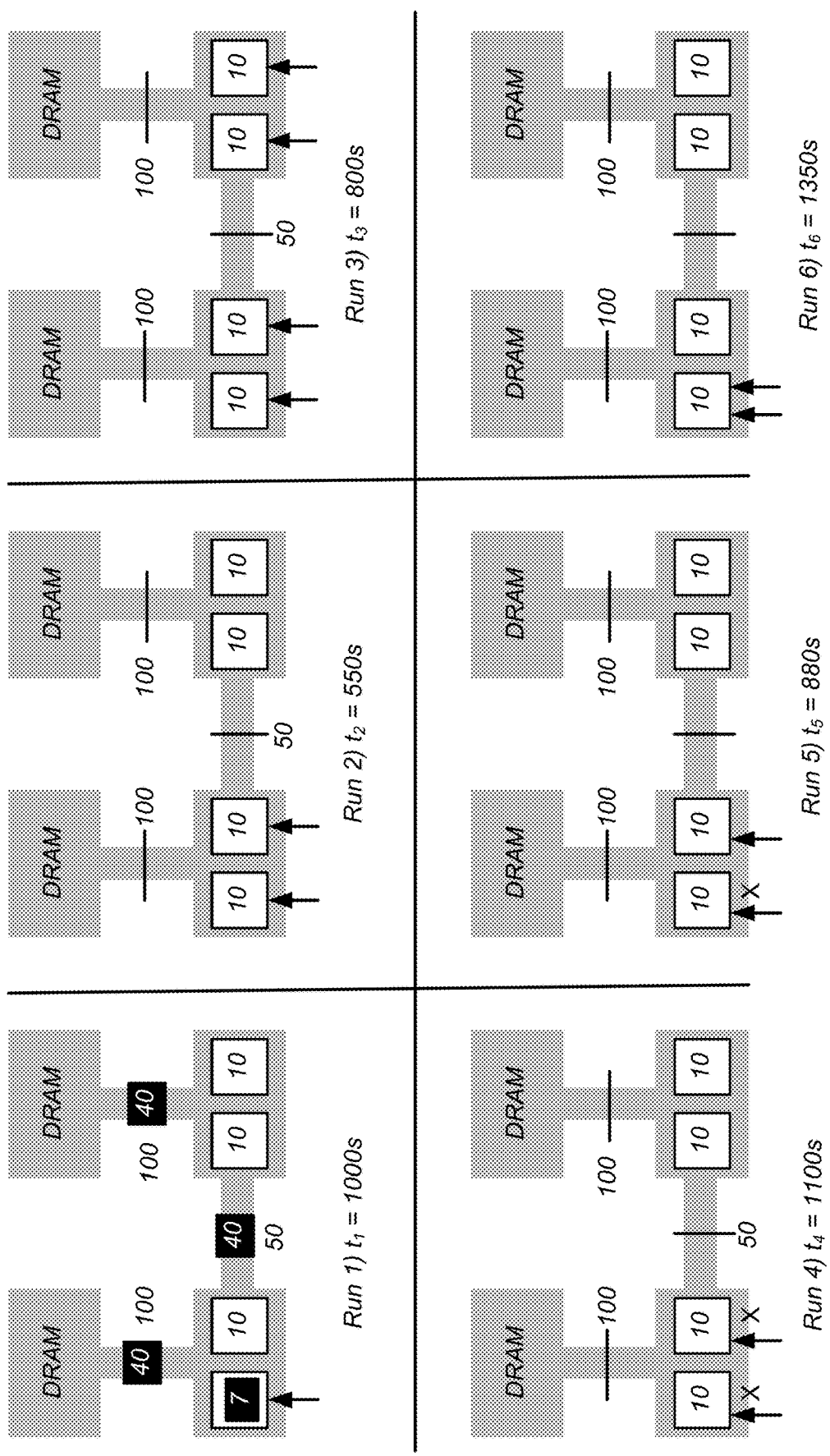
FIG. 19 is a logical block diagram illustrating 6 test workload runs used to generate a description of an example workload in one embodiment.

FIG. 19 is a logical block diagram illustrating 6 example workload test runs used, such as by workload description generator 1430, to generate a description of an example workload in one embodiment. In the illustrated test runs, arrows represent threads and crosses represent stress applications. The details of the example test runs will be described in more details subsequently regarding the properties and calculations performs during test runs.

Figure 20:
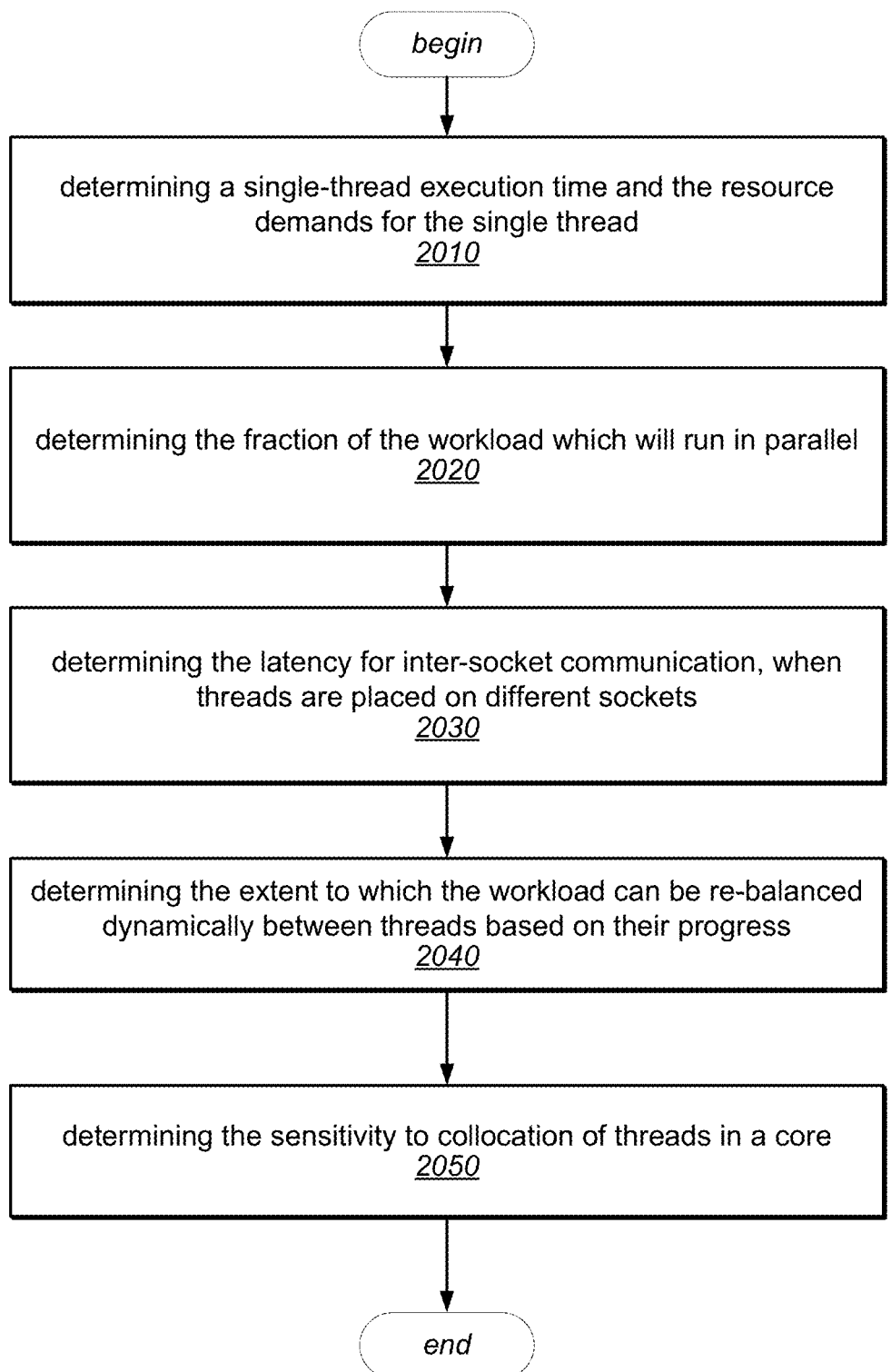
FIG. 20 is a flowchart illustrating one embodiment of a method for generating a workload description, according to one embodiment.

FIG. 20 is a flowchart illustrating one embodiment of a method for generating a workload description. As illustrated in block 2010, workload description generator 1430 may determine execution time and/or resource demands for a single thread. For example, the workload may be run with a single thread to obtain (e.g., calculate) an instruction execution rate and bandwidth requirements to each level of cache hierarchy as well as to main memory, as will be described in more detail subsequently.

Workload description generator 1430 may also determine a fraction of the workload that may be executed in parallel, as in block 2020. For instance, in one embodiment workload description generator 1430 may perform an additional workload run with threads placed to avoid contention and the number of threads set sufficiently low to avoid over-subscribing resources. From timing this run, the parallel fraction may be calculated, as will be described in more detail subsequently. In some embodiments, over-subscription may be avoided based on the machine description's record of the resources available in the machine, and the single-thread resource usage determined at block 2010. Threads may be placed on each core in turn such that the total load on the machine remains below resource availability.

Workload description generator 1430 may further determine the latency (or may determine a value indicating the latency) for inter-socket communications when threads are placed on different sockets, as in block 2030. For example, in some embodiments inter-socket latency may be defined as the additional time penalty a given thread incurs for each of the threads on a different socket (e.g., different to the given thread). To determine inter-socket latency workload description generator 1430 may, in some embodiments, perform another workload run using the same placement as that used for determining the parallel fraction, but moving a portion (e.g., half) of the threads onto the other socket. The inter-socket latency may then be determined based on results of this additional workload run, as will be described in more detail subsequently.

Workload description generator 1430 may also determine an extent to which the workload may be re-balanced between threads based on their progress, as in block 2040. For example, to determine a load-balancing factor, workload description generator 1430 may deliberately slow down threads and observe how the workload's execution changes, as will be described in more detail subsequently.

Workload description generator 1430 may further determine the sensitivity to collocation of threads within a core, as in block 2050. For example, workload description generator 1430 may compare the performance of two workload runs that differ only in the collocation of threads on cores. Core burstiness, or the percentage extra time required due to collocation may be calculated, as will be descried in more detail subsequently. While the various steps illustrated in FIG. 20 are shown in particular order, they may be performed in different orders according to various embodiments.

Single Thread Time and Resource Demands (Step 1)

First, the workload may be run with a single thread to get the time tl along with the instruction execution rate and the bandwidth requirements for a single thread between each level of the cache hierarchy and between the last level cache and the main memory. These metrics may provide the basic sequential resource demands of the workload. They may be measured using the same performance counters described above during a single run. Since, there is only 1 thread, scaling due to the results from other steps described below may not be required for this step. Run 1 of FIG. 19 shows an example of the results collected according to an example embodiment.

In each subsequent step the execution time recorded at step x ($t_x$) may be normalized relative to this sequential execution time $r_x = t_x/t_l$ and this relative time rx may be the product of the known factors ($k_x$) already accounted for in previous steps, and the unknown factors ($u_x$) which are not yet determined. In some embodiments $k_x$ may be calculated based on the workload description from the existing steps. $u_x$ may then be calculated by $u_x = r_x/k_x$ Parallel Fraction (Step 2)

The parallel fraction (e.g., an expected workload scaling in the absence of other constraints) may be determined with an extra run, as illustrated in FIG. 19 (Run 2). This thread placement may use only 1 thread per core, and may constrain those threads to a single socket. This may, in some embodiments, avoid dependencies on any other as-yet-uncalculated parts of the workload model. The placement may also be constrained to avoid over-subscription so that information from subsequent modelling steps does not need to be incorporated, thereby ensuring only 1 valid value ofp. In practice choosing such a placement may not represent a problem on any of the hardware looked at so far as the existing constants may mean it is only required to not overload the cumulative L3 cache bandwidth and the main memory bandwidth. In some embodiments, when selecting this placement, the largest number of threads that can be placed on a single socket while still satisfying the above conditions may be used and the placement may be made to use an even number of threads so that the result may be reused. p may then be derived from Amdahl's law with the equation:

$$u_2 = 1 - p + \frac{p}{n}$$

Inter-Socket Latency (Step 3)

Following the workload assumptions, each thread may be assumed to communicate equally with every other thread, according to some embodiments. Each of the links between threads may incur a latency ($o_s$) if it crosses an inter-socket boundary. Thread placement may be chosen to measure this maintains symmetry for all thread communication, as in run 3 of FIG. 19.

Adding the $$\frac{n}{2}$$

links in this placement that incur the latency $o_s$ to the parallel fraction model results in:

$$r_3 = \left(1 + \frac{\frac{n}{2} \times o_s}{f_{comm}}\right)\left(1 - p + \frac{p}{n}\right),$$

according to this example embodiment.

The links $o_s$ may be scaled by $f_{comm}$ as described above regarding thread utilization. Removing the known factors this becomes:

$$u_3 = 1 + \frac{\frac{n}{2} \times o_s}{f_{comm}}$$

from which $o_s$ may be solved according to this example embodiment.

Load balancing factor (Step 4)

The profiling runs for steps 1-3 may use symmetric placements (e.g., in the sense that each thread may experience the same (or similar) contention as other threads. For instance, in some embodiments using symmetric placements may involve having the same number of threads per core and the same number of threads per socket across all cores and sockets hosting threads. However, in some embodiments, the workload description may be extended to describe cases where threads are not placed symmetrically. In these cases, it may be important to determine the effect on the overall speed of a workload if some threads slow down more than others. For instance, some workloads may use static work distribution, and a slow thread may become a straggler, possibly delaying completion of workload. Other workloads may use work stealing to distribute work dynamically between threads, thereby possibly allowing any slowness by one thread to be compensated for by other threads picking up its work, so performance may be the aggregate throughput.

In some embodiments, this may be expressed by using a load balancing factor $l \in [0 \ldots 1]$ indicating where a workload lies between these extremes. If l=0 then there is no dynamic load balancing, and the threads proceed in lock-step. If l=1 then they may proceed independently, according to some embodiments. In practice, workloads may be somewhere between these points. The load balancing factor l may be measured by considering how the performance of one thread impacts the performance of the complete workload. To do this, in some embodiments, threads may be deliberately slowed down and how the workload's execution changes may be observed. In a given run, $s_i$ may be considered the slowdown of thread i, and $s_{min} = \min_{i=1}^{i=n} s_i$. If there are n threads, and a parallel fraction p, then the relative execution rate in the two extreme cases is:

lock-step:

$$s_{lock} = ((1-p) \times s_{min} + p \times \max_{i=1}^{i=n} s_i)$$

Load-balanced:

$$s_{bal} = \left((1-p) \times s_{min} + np \middle/ \left(\sum_{i=1}^{n} \frac{1}{s_1}\right)\right)$$

For a run in between these extremes the relative execution rate ($s_i$) is:

$$s_i = (1-l) \times s_{lock} + l \times s_{bal}$$

In some embodiments, l may be calculated from multiple (e.g., 3) runs, with all runs possibly using the same thread layout, as in FIG. 19 (Runs 2, 4, & 5). In run 2 the threads may execute as normal, so for all i, $s_i=1$. In run 4 all threads may compete against a simple CPU-bound loop which will delay their execution. The ratio between these relative times gives $u_4/u_2 = s_{stresser} > 1$. Using this value values for $s_{lock}$ and $s_{bal}$ may be constructed for the case where n−1 threads have $s_i=1$ and 1 thread has $s_i = s_{stresser}$. In run 5 only one thread may be slowed. The slowdown experienced is $u_5/u_2 = S_l$ allowing the above equation to be solved for l.

Core Burstiness (Step 5)

To account for core burstiness the performance of two runs may be compared which differ only in the collocation of multiple threads per core, FIG. 19 (Runs 2, & 6). The first run may use one thread per core across a single socket, while the second run may use the same number of threads packed into half the number of cores, according to one example embodiment.

Taking the unknown factors remaining in these two runs burstiness may be defined as the percentage extra time required due to collocation:

Burstiness: $b = \frac{1}{f_b} \times \left(\frac{u_6}{u_2} - 1\right)$

In the above burstiness equation, $\frac{1}{f_b}$ is used since there is no scaling (i.e., $u_2=1$) in this example embodiment. However, in other embodiments, scaling may need to be included (e.g., from whichever run replaces $u_2$), replacing $\frac{1}{f_b}$ with the scaling factor divided by $f_b$.

Performance Prediction

Given a machine description, workload description and a proposed thread placement, the performance for the proposed thread placement may be predicted. The performance may be constructed from two elements: (i) an anticipated speed-up based on Amdahl's law assuming perfect scaling of the parallel section of the workload, and (ii) a slowdown reflecting the impact of resource contention and synchronization, according to some embodiments.

Speedup. As discussed above a speedup may be calculated (e.g., via Amdahl's law) based on the parallel fraction of the workload (p) and the number of threads in use (n). For example, using an example workload described above (p=0.9) and using the placement in FIG. 9, n=3 so speedup=2.5.

Slowdown. The slowdown may then be predicted by considering the resource-contention, communication, and synchronization introduced by the threads. These factors may be considered interdependent. In some embodiments, these different factors may be handled by proceeding iteratively until a stable prediction is reached (in some embodiments only a few iteration steps may be needed for the workloads).

Figure 21:
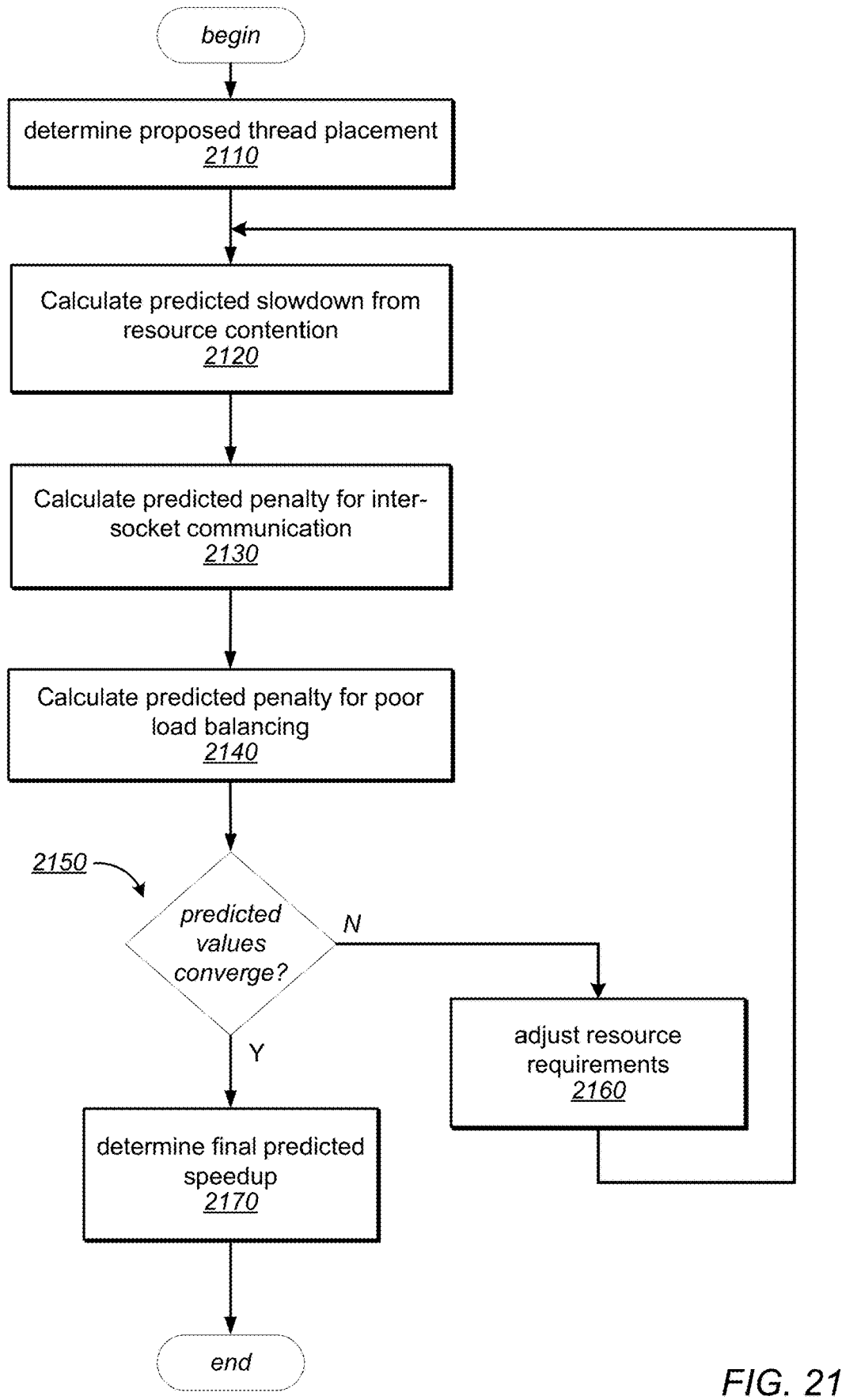
FIG. 21 is a flow chart illustrating one embodiment of a method for performance prediction using three example threads.

FIG. 21 is a flow chart illustrating one embodiment of a method for performance prediction, for three threads U, V, W, running the workload from FIG. 19. First, a proposed thread placement may be determined, as in block 2110. Then a predicted slowdown may be calculated from resource as in block 2120. For instance, in one embodiment a naive set of resource demands based on the per-thread resource usage may be combined with the machine model based on the locations of the threads and used to model contention for hardware resources.

Additionally, as in block 2130, a predicted penalty for inter-socket communication may be calculated. For example, to predict the performance impact of inter-socket communication, the system may consider the locations of the threads being modeled and the amount of work that will be performed by each thread. An overhead value representing additional latency may be determined as the latency incurred by a given thread when communicating with another thread. Additionally, the slowdown incurred by the placement of threads on different sockets as well as the prevalence of lockstep execution between threads may both be accounted for.

The predicted penalty for poor load balancing may also be calculated as in block 2140. For example, in some embodiments, the workload's load balancing factor may be used to interpolate between the extreme case and the workload's current predicted slowdown.

As illustrated by the negative output of decision block 2150, if the per-thread predictions have not converged, the results from the communication and synchronization phased (described above regarding blocks 2120, 2130 and 2140) may be feed back into the contention phases. For example, each time around the loop in FIG. 21, new values may be calculated for the contention-based slowdown which may be used to estimate the costs of communication and synchronization, which in turn may be fed back into the next iteration. Additionally, as in block 2160, the resource requirements may be adjusted each time through the loop, such as to allow for slowdowns from interconnect as one example, as will be described in more detail below regarding iterating. After the per-thread predictions have converged, as indicated by the positive output of decision block 2150, the final predicted speedup may be calculated, as in block 2170. For example, in some embodiments, the final predicted speedup may be calculated by combining the speedup from Amdahl's law with the average slowdown predicted for the threads.

Thus, for each thread, there may be maintained (i) an overall predicted slowdown, and (ii) the thread utilization factor (fd) used to scale resources to the time the thread is working. Initially, a factor of the Amdahl's law speedup divided by the ideal speedup may be used.

Additionally, alternating between (i) modeling the contention for hardware resources occurring as the threads execute, and (ii) Adding or removing slowdown attributed to communication and synchronization may also be used, in some embodiments.

The following table illustrates, according to one example, the start of the first iteration:

|  | Thread | | |
| --- | --- | --- | --- |
|  | U | V | W |
| Resource slowdown | 1.00 | 1.00 | 1.00 |
| +communication penalty | 0.00 | 0.00 | 0.00 |
| +load balance penalty | 0.00 | 0.00 | 0.00 |
| Overall slowdown | 1.00 | 1.00 | 1.00 |
| New thread utilization | 0.83 | 0.83 | 0.83 |

In some embodiments, the thread utilization factors may be initialized as the Amdahl's law speedup divided by the ideal speedup, the number of threads. This reflects the fraction of the time that a thread would be busy if the Amdahl's law speedup is achieved. For instance, if n=3, and the Amdahl's law speedup is 2.5, then the threads will be busy in parallel work for 0.83 of their time. This first estimate may be referred to herein as $f_{initial}$. Note that the same value may be used across all threads rather than distinguishing a main thread which executes sequential sections. This may reflect an assumption of generally-parallel workloads in which sequential work is scattered across all threads in critical sections.

Slowdown From Resource Contention

Figure 22:
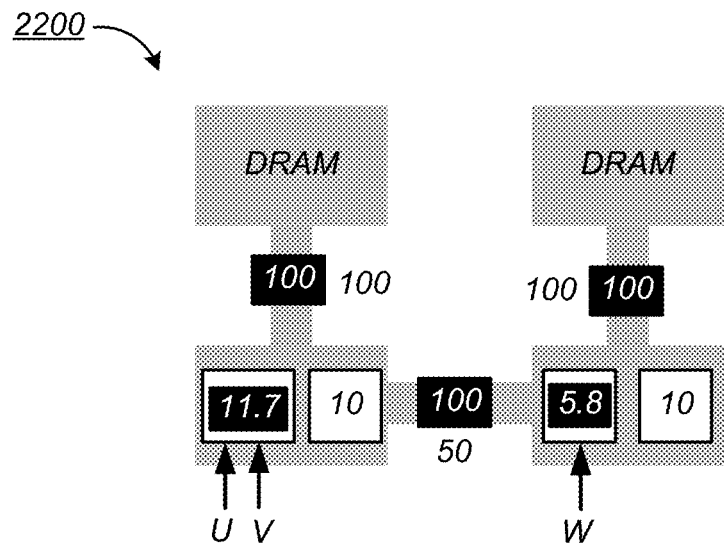
FIG. 22 is a logical block diagram illustrating an example machine model using initial resource demand values for three threads, according to one embodiment.

In some embodiments, contention for hardware resources may be modeled by starting from a naïve set of resource demands based on the vector d in the workload description. For instance, the values in the vector may represent rates and therefore may be added at each of the locations running a thread from the workload. These values may be scaled by the respective thread utilization factors. Thus, for each resource, contributions of the individual threads may be summed and the aggregate rate demanded may be shown. For example, while the aggregate required bandwidth to DRAM is 3×40=120, it is scaled 0.83×120=100, as illustrated by the example machine description 1000 in FIG. 22.

Based on the resource demands, the overall predicted slowdowns for each thread may be initialized. The vector may be initialized to the maximum factor by which any resource used by the thread is over-subscribed. In the example, this is the interconnect link between the two sockets which is oversubscribed by a factor of $$\frac{100}{50} = 2.$$

In more complex examples, according to different embodiments, different threads may see different bottlenecks.

This basic model of contention may be applied for all of the resources in the machine. However, in addition, the workload model's core burstiness factor (b) may be incorporated in cases where threads share a core. The following table illustrates example slowdowns updated based on the most over-subscribed resource used by each thread and to reflect the fact that U and V share a core:

|  | Thread | | |
| --- | --- | --- | --- |
|  | U | V | W |
| Resource slowdown | 2.83 | 2.83 | 2.00 |
| +communication penalty | 0.00 | 0.00 | 0.00 |
| +load balance penalty | 0.00 | 0.00 | 0.00 |
| Overall slowdown | 2.83 | 2.83 | 2.00 |
| New thread utilization | 0.29 | 0.29 | 0.42 |

Threads U and V may be slowed by b' in this example workload model because they share a core, whereas W is not. b' is the scaled value of b, and is calculated by:

$$b'=1+b \times f_b f_b = 0.83$$

As described above, this may reflect the fact that some workloads show significant interference between threads on the same core even though the average resource demands for functional units are well within the limits supported by the hardware, according to various embodiments. The thread utilization factors may then be recomputed reflected these new slowdowns. For instance, while initially calculated by the Amhahl's law speed up divided by the ideal speed up, the slowdown may now be included, such as by dividing the Amdahl's law speedup by the expected slowdown. This in this example, (2.5/2.83)/3=0.29 and (2.5/2)/3=0.42.

Penalties for Off-Socket Communication

The overheads introduced by synchronization between threads may also be accounted for. For example, there may be two factors to consider. First, the slowdown incurred by the placement of threads on different sockets, leading to increased latency in their use of shared-memory data structures for communication. Second, prevalence of lockstep execution between threads, requiring threads performing at different rates to wait for one another.

Quantitatively, the overhead value $o_s$ may represent the additional latency for each pair of threads that is split between different sockets, such as under the assumption that the work performed is distributed evenly between the threads (as it is in the profiling runs). To predict the performance impact of communication, the system may consider (i) the locations of the threads being modeled, and hence the number of pairs which span sockets, and (ii) the amount of work that will be performed by each thread, and hence how significant or not a given link will be. In some embodiments, $o_{i,j}$ may be defined to be the latency incurred by thread i for communication between threads i and j—this is equal to $o_s$ if the threads are on different sockets and 0 otherwise.

To model the amount of work performed by each thread the load balancing factor may be considered. For example, if the threads proceed in lockstep then the amount of work they perform may be equal, whereas if they are completely independent then faster threads may perform more of the work. The communication in these two extreme cases may be considered and interpolated linearly between them based on the load balancing factor l.

Completely lock-step execution. When execution proceeds without any dynamic load balancing, each of the threads may perform an equal amount of work so additional slowdown for communication for thread i is: lockstep(i)=$\Sigma_{j=1}^{j=n} o_{i,j}$ In the example:

lockstep(U)=lockstep(V)=0.0+0.0+0.1 lockstep(W)=0.1+0.1+0.0

Completely independent execution. When execution is completely independent, the amount of work performed by the threads may differ. The busier threads may communicate more, and their links with other threads may be more significant. Given the current predicted slowdowns for each thread $s_1 \ldots s_n$, the weight $w_i$ of a thread may be defined as the fraction of the total work that thread i will perform:

$$work_i = \frac{1}{s_i} \quad w_i = \frac{work_i}{\sum_{j=1}^{j=n} work_j}$$

In the example, given slowdowns 3, 3 and 2 for the three threads, we have weights 2/7, 2/7 and 3/7 respectively. The fastest thread may perform more of the work than the slower threads, and the communication it performs is likely to be more significant. For instance, in a system with caches, it may be stealing cache lines from the other threads more frequently.

Given these weights the communication cost is then:

independent(i)=$n \Sigma_{j=1}^{j=n} w_j o_{i,j}$

In the example:

$$\begin{aligned} \text{independent}(U) &= \text{independent}(V) \\ &= (0.88 \times 0.0 + 0.88 \times 0.0 + 1.24 \times 0.1) \\ &= 0.124 \end{aligned}$$

$$\begin{aligned} \text{independent}(W) &= (0.88 \times 0.1 + 0.88 \times 0.1 + 1.24 \times 0.0) \\ &= 0.176 \end{aligned}$$

Combining the results. Given the two extreme cases, bandwidth modeler 110 may interpolate linearly between them based on the load balancing factor to obtain an additional slowdown factor:

comm. slowdown($i$)=$l$ independent($i$)+(1−$l$) lockstep ($i$)

In the example:

$$comm.slowdown(U) = comm.slowdown(V)$$
$$= 0.5 \times 0.1 + 0.5 \times 0.124$$
$$= 0 \times 112$$

$$comm.slowdown(W) = 0.5 \times 0.2 + 0.5 \times 0.176$$
$$= 0.188$$

Each of these may then be scaled by $f_l$ (0.29, 0.29 & 0.42), such as to allow for the extra time available for communication if the other operations are slowed down by other conflicts. These may then be added to the existing slowdowns for each of the threads.

Penalties for Poor Load Balancing

Additionally, whether or not the workload can dynamically rebalance work between the threads may be accounted for. In one extreme case, if the threads proceed completely in lock-step, then they may have to wait for one another to complete work and so the overall performance may be governed by the slowest thread. In the example, thread W would be slowed down to match U and V if they operated completely in lockstep, and all three threads would have slowdown 2.88.

In some embodiments, the workload's load balancing factor l may be used to interpolate between the extreme case and the workload's current predicted slowdown. The following two tables illustrate, according to this example embodiment, where l=0.5, W being slowed down to the point 50% of the way between 2.08 and 2.87:

The following table illustrates example slowdowns updated to include predicted cross-socket communication where U and V communicate with lower overhead than U and W:

|  | Thread | | |
| --- | --- | --- | --- |
|  | U | V | W |
| Resource slowdown | 2.83 | 2.83 | 2.00 |
| +communication penalty | 0.03 | 0.03 | 0.08 |
| +load balance penalty | 0.00 | 0.00 | 0.00 |
| Overall slowdown | 2.87 | 2.87 | 2.08 |
| New thread utilization | 0.29 | 0.29 | 0.40 |

The following table illustrates how, after the first iteration, slowdowns updated to include the effect of dynamic load balancing between the threads:

|  | Thread | | |
| --- | --- | --- | --- |
|  | U | V | W |
| Resource slowdown | 2.83 | 2.83 | 2.00 |
| +communication penalty | 0.03 | 0.03 | 0.08 |
| +load balance penalty | 0.00 | 0.00 | 0.40 |
| Overall slowdown | 2.87 | 2.87 | 2.48 |
| New thread utilization | 0.29 | 0.29 | 0.34 |

Iterating

In some embodiments, the system may alternate between updating the slowdown estimates based on resource contention and updating the estimates for the impact of communication and synchronization. Each time around the loop in FIG. 21, new values may be calculated for the contention-based slowdown, then these may be used to estimate the costs of communication and synchronization, which in turn may be fed back into the next iteration. In some embodiments, only a few iteration steps may be needed for the workloads.

For example, information may be fed from iteration i to 1+1 by updating the thread utilization factors used as the starting point for 1+1. For each thread, the system may determine the amount of overall slowdown in iteration i that was due to the penalties incurred. In some embodiments, this may be the ratio of the thread's slowdown due to resource contention to its overall slowdown. In the ongoing example, threads U and V have 2.83/2.87=0.99, and thread W has 2.0/2.48=0.81. This difference may reflect the fact that thread W is harmed by poor load balancing. The new iteration (i+1) may be started by resetting the thread utilization factors to $f_{initial}$ scaled by the penalties. this may be considered as transferring the lessons learned about synchronization behavior in iterations 1 . . . i into the starting point for iteration i+1.

To feed results from the communication and synchronization phase back into the contention phase the system may, in some embodiments, calculate new thread usage factors, such as to reflect any changes to the performance limitations of each thread from synchronization or communications delays. Following the ongoing example, the thread utilizations for thread U and V are updated to $f_{initial}$*0.99=0.83*0.99=0.82, and W is updated to 0.83*0.81=0.67, as in the following table, which illustrates the state at the start of the second iteration:

|  | Thread | | |
| --- | --- | --- | --- |
|  | U | V | W |
| Resource slowdown | 1.00 | 1.00 | 1.00 |
| +communication penalty | 0.00 | 0.00 | 0.00 |
| +load balance penalty | 0.00 | 0.00 | 0.00 |
| Overall slowdown | 1.00 | 1.00 | 1.00 |
| New thread utilization | 0.82 | 0.82 | 0.67 |

Figure 23:
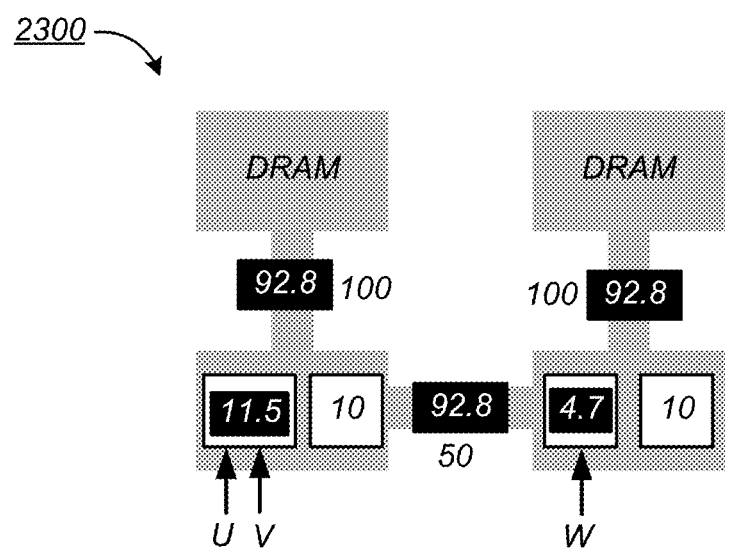
FIG. 23 is a logical block diagram illustrating an example machine model using resource demand values for three threads at the start of a second iteration, according to one embodiment.

Thus, in the ongoing example, the new thread utilization factors are 0.82 for U and V, and 0.67 for W. The other parts of the prediction are reset and the system may continue by computing the new resource demands based on the new thread utilization factors, as illustrated in FIG. 23. Comparing the resource demands illustrated in FIG. 22 with those in FIG. 23, the load imposed by thread W is reduced (e.g., significantly), but the interconnect remains the bottleneck.

Final Predictions

After the per-thread predictions have converged, the final predicted speedup may be calculated, such as by combining the speedup from Amdahl's law with the average slowdown predicted for the threads using the model:

$$speedup = \text{Amdahl's law } speedup \times \frac{\sum_{i=1}^{n} \frac{1}{s_i}}{n}$$

In the example, this gives a predicted speedup of 1.005 after 4 iterations. This extremely poor performance may be considered as primarily due to the inter-socket link being almost completely saturated by a single thread.

Evaluation of the systems, methods and techniques described herein are described in two sections. First synthetic applications may be profiled with control over the memory placement and the measured placement is compared with reality. Additionally, the benchmarks may be rerun and used to evaluate how their bandwidth is allocated and their accuracy changes. In some embodiments, one or more benchmarks designed to mimic real (e.g., real world) loads may be used in addition to, or in place of, synthetic benchmarks. These tests were run on a selection of Intel processors with different architectures and core counts. Note that some operating systems, such as Linux™ may try to adjust the placement of memory during the execution of the benchmark.

To prevent this and to allow measurement of the benchmarks in a stable state, autonuma may be disabled in all tests.

This approach has may be considered, in some embodiments, to have a limitation in that it may assume that with per-thread data, each thread's data may be accessed with the same frequency. An example of when this would not be the case is Page Rank if the graph is constructed by walking the graph and the first thread loads the first 1/n nodes visited, the second loads the second 1/n and so on. The problem may occur due to, after a short period of exploring the graph, the walker may reach a well-connected segment. From here it will likely mostly reach other well connected nodes, whereas the last 1/n nodes will more likely be weakly connected hence taking so long to be discovered by the walker. As a result more popular values may appear on the first socket than on the second, on average. This may result in higher bandwidth requirements on the first socket which may erroneously be marked as static bandwidth. This may then confuse the calculation of both local and per-thread fractions. When the threads are moved around, the bandwidth requirements may fail to change in the way described.

This could be overcome by randomizing graph data, but this may reduce cache effects, and on processors with slow QPI links may also reduce performance as the speed up of the threads that do not need to use the QPI links as much may outweigh the slowdown of the threads that need to use it more.

A more satisfactory approach may be to extend the model to detect such situations and allow for them. There are a number of points at which it may be possible to detect these issues and to potentially correct for them. There may be alternative ways of calculating the same results from different sets of the counters. For example, after calculating the static fraction, the ratio of local and remote accesses on each socket may be compared to ensure that once the static data transfer is removed these are symmetric, according to one embodiment.

Conclusion

Described herein are systems, methods and techniques for modeling bandwidth utilization of analytics applications on multi-socket machines (e.g., NUMA machines). Bandwidth Models may be fitted to applications through the use of instrumented runs with specific thread placements. Also described herein are techniques for implementing a tool able to measure hardware and workloads in order to construct a model from 6 runs that predicts the performance and resource demands of the workload with different thread placements on the hardware, according to some embodiments. Testing this on a set of 22 workloads across many thousands of placements has shown a high degree of accuracy from most workloads, according to some embodiments. This means that the results may be used to make real decisions about the placements of workloads. As the measurements made by the techniques described herein may be comparable between workloads, they may be extended the collocation of multiple workloads.

The model may be built around measuring the CPU and bandwidth resource demands, coupled with measurements of the interactions between threads, according to some embodiments. The simple bandwidth-based level of detail may be considered effective for the workloads describe herein. This may be considered in contrast to much prior work which has generally focused on more detailed models of how workloads interact through competition for shared caches. The trend appears to be that while individual cache architectures are possibly becoming more complex, the necessity to model them in detail is possibly being diminished. One reason for this difference may be that hardware may now be more effective in avoiding pathologically bad behavior. This kind of technique may make workloads less susceptible to "performance cliffs".

In some embodiments, the techniques described herein may be operated at the level of rack-scale clusters. The number of possible placements of threads on even a single 36 cores node with hyper-threading may exceed $1.5 \times 10^{18}$, and even with symmetry taken into account there may still be 18144 possible thread placements. The techniques as described herein were discussed in referenced to applications running on a single cluster node, such as to allow for the generation of a set of job placements to compare the model against that covers approximately 20% of the possible placements, according to various example embodiments.

Example Computing System

Figure 24:
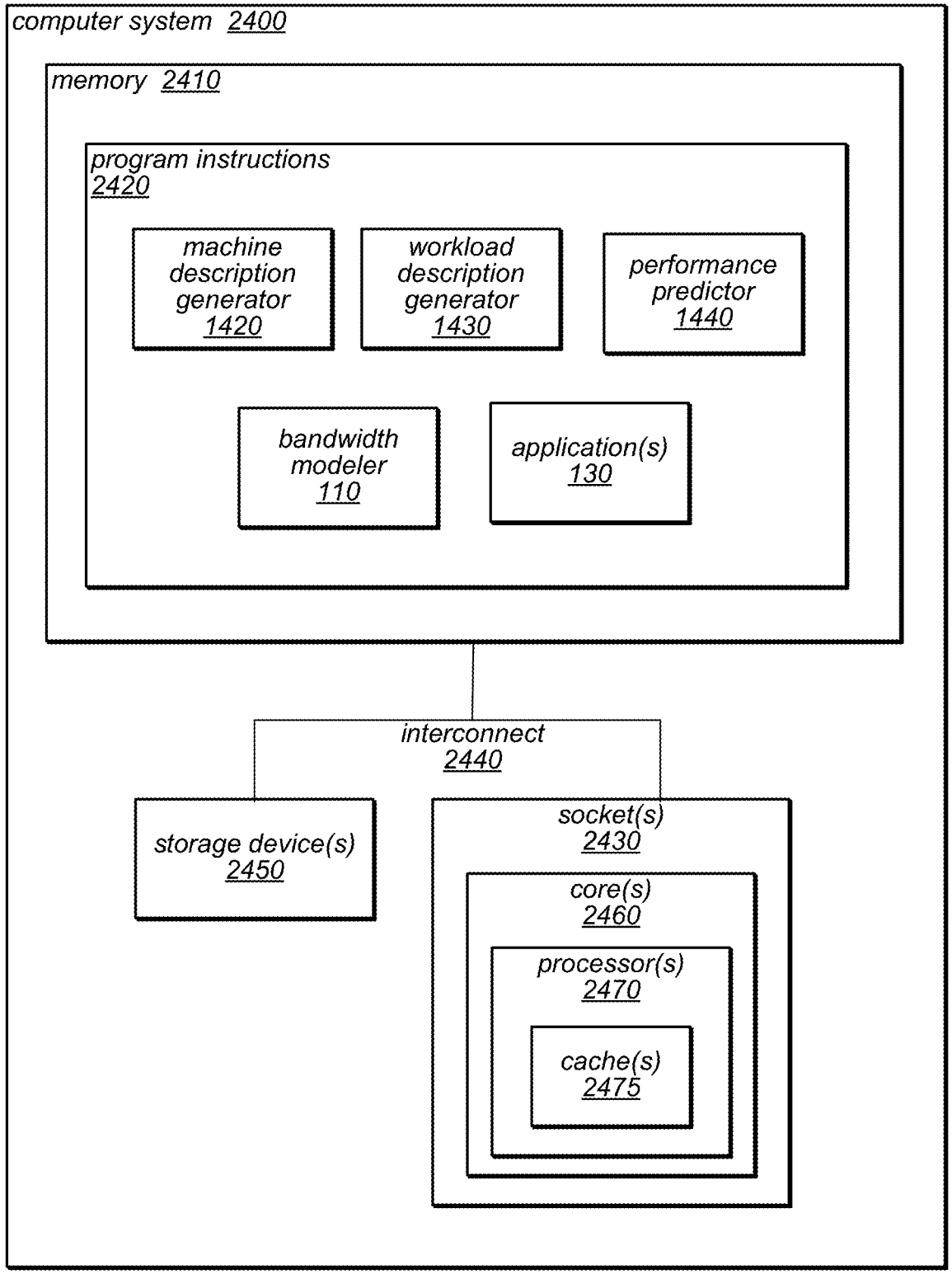
FIG. 24 is a logical block diagram illustrating one embodiment of a computing system that is configured to implement the methods, mechanisms and/or techniques described herein.

The techniques and methods described herein for Detection, Modeling and Application of Memory Bandwidth Patterns may be implemented on or by any of a variety of computing systems, in different embodiments. For example, FIG. 24 is a block diagram illustrating one embodiment of a computing system that is configured to implement such techniques and methods, as described herein, according to various embodiments. The computer system 2400 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

Some of the mechanisms for Detection, Modelling and Prediction of Memory Access Patterns, as described herein, may be provided as a computer program product, or software, that may include a non-transitory, computer-readable storage medium having stored thereon instructions, which may be used to program a computer system 2400 (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 2400 may include one or more processors 1270; each may include multiple cores, any of which may be single- or multi-threaded. For example, multiple processor cores may be included in a single processor chip (e.g., a single processor 2470), and multiple processor chips may be included in computer system 2400. Each of the processors 2470 may include a cache or a hierarchy of caches 2475, in various embodiments. For example, each processor chip 2470 may include multiple L1 caches (e.g., one per processor core) and one or more other caches (which may be shared by the processor cores on a single processor). The computer system 2400 may also include one or more storage devices 2450 (e.g.

optical storage, magnetic storage, hard drive, tape drive, solid state memory, etc.) and one or more system memories 2410 (e.g., one or more of cache, SRAM, DRAM, RDRAM, EDO RAM, DDR 10 RAM, SDRAM, Rambus RAM, EEPROM, etc.). In some embodiments, one or more of the storage device(s) 2450 may be implemented as a module on a memory bus (e.g., on interconnect 2440) that is similar in form and/or function to a single in-line memory module (SIMM) or to a dual in-line memory module (DIMM). Various embodiments may include fewer or additional components not illustrated in FIG. 24 (e.g., video cards, audio cards, additional network interfaces, peripheral devices, a network interface such as an ATM interface, an Ethernet interface, a Frame Relay interface, etc.)

The one or more processors 2470, the storage device(s) 2450, and the system memory 2410 may be coupled to the system interconnect 2440. One or more of the system memories 2410 may contain program instructions 2420. Program instructions 2420 may be executable to implement machine description generator 1420, workload description generator 1430, performance predictor 140, bandwidth modeler 110, and/or one or more applications 130 (e.g., applications for which memory bandwidth may be modeled and for which thread placement may be based, at least in part on modeled bandwidth patterns and/or bandwidth signatures) as well as other programs/components configured to one or more of the systems, methods and/or techniques described herein.

Program instructions 2420 may be encoded in platform native binary, any interpreted language such as Java™ byte-code, or in any other language such as C/C++, the Java™ programming language, etc., or in any combination thereof. In various embodiments, machine description generator 1420, workload description generator 1430, performance predictor 140, machine bandwidth modeler 110 and/or applications 130 may each be implemented in any of various programming languages or methods. For example, in one embodiment, machine description generator 1420, workload description generator 1430, performance predictor 140, bandwidth modeler 110 and/or applications 130 may be based on the Java programming language, while in other embodiments they may be written using the C or C++ programming languages. Moreover, in some embodiments, machine description generator 1420, workload description generator 1430, performance predictor 140, bandwidth modeler 110 and/or applications 130 may not be implemented using the same programming language.

Although the embodiments above have been described in considerable detail, numerous variations and modifications will become apparent to those skilled in the art once the above disclosure is fully appreciated. For example, although many of the embodiments are described in terms of particular types of operations that support synchronization within multi-threaded applications that access particular shared resources, it should be noted that the techniques and mechanisms disclosed herein for accessing and/or operating on shared resources may be applicable in other contexts in which applications access and/or operate on different types of shared resources than those described in the examples herein and in which different embodiments of the underlying hardware that supports persistent memory transactions described herein are supported or implemented. It is intended that the following claims be interpreted to embrace all such variations and modifications.

What is claimed:

1. A method, comprising:
performing by one or more computing devices:
modeling memory bandwidth patterns for a multi-core system comprising multiple sockets, each of which comprises multiple cores, wherein said modeling is based at least in part on results from executing one or more profiling sessions on the multi-core system and values of one or more machine performance counters configured to indicate amounts of data transferred on respective sockets of the multi-core system;
wherein said modeling comprises:
executing a workload on the multi-core system, comprising executing multiple threads of the workload on the multi-core system;
determining, for a plurality of bandwidth classes, respective amounts of the workload's total memory accesses, in terms of amount of data transferred, that corresponds to respective ones of the plurality of bandwidth classes, wherein the plurality of bandwidth classes represent different types of memory access by the workload when executing on the multi-core system, wherein said determining is based, at least in part, on the values of the machine performance counters;
wherein the bandwidth classes comprise one or more of:
static memory access representing accesses to memory allocated in a single memory bank used by all threads of the workload;
local memory access representing accesses to memory by threads on the same sockets as which the memory is allocated;
interleaved shared memory access representing accesses to memory allocated evenly across the sockets; or
per-thread shared memory access representing accesses to memory allocated by one thread and used by all threads of the workload; and
allocating, for an application executing on the multi-core system, memory to be accessed by one or more threads of the application, according to the modeled memory bandwidth patterns.

2. The method of claim 1, wherein said determining is based, at least in part on one or more values of machine performance counters indicating one or more of:
a number of local memory accesses performed by the workload;
a number of remote memory accesses performed by the workload;
a total number of instructions executed per-thread by the workload; or
a total amount of time over which the total number of instructions were executed by the workload.

3. The method of claim 1, wherein said determining is based, at least in part on one or more values of machine performance counters indicating one or more of:
- an amount of data sent to and from a local memory bank local to a CPU on which a particular thread of the workload is executing; or
- an amount of data sent to and from one or more remote memory banks distinct from the local memory bank.

4. The method of claim 1, wherein said executing the workload comprises executing one or more profiling runs on the multi-core system comprising a plurality of thread placements.

5. The method of claim 4, wherein executing the workload on the multi-core system with a plurality of thread placements comprises one or more of:
- placing exactly one thread on one or more cores of each socket of the multi-core system, wherein each socket has threads placed on the same number of cores of the respective socket; or
- placing exactly one thread on one or more cores of each socket of the multi-core system, wherein different ones of the multiple sockets have threads placed on different numbers of their respective cores.

6. The method of claim 1, further comprising normalizing one or more values of the machine performance counters, comprising one or more of:
- dividing a total amount of data accessed via local reads for a respective socket by an average number of instructions executed by threads executing on the respective socket;
- dividing a total amount of data accessed via remote reads for a respective socket by an average number of instructions executed by threads executing on the respective socket;
- dividing a total amount of data accessed via local writes for a respective socket by an average number of instructions executed by threads executing on the respective socket; or
- dividing a total amount of data accessed via remote writes for a respective socket by an average number of instructions executed by threads executing on the respective socket.

7. The method of claim 1, wherein said determining further comprises one or more of:
- determining a static fraction representing a relative amount of the total memory accesses corresponding to static memory accesses;
- determining a local fraction representing a relative amount of the total memory accesses corresponding to local memory accesses;
- determining a per-thread fraction representing a relative amount of the total memory accesses corresponding to per-thread memory accesses; or
- determining a per-thread fraction representing a relative amount of the total memory accesses corresponding to per-thread memory accesses.

8. The method of claim 1, further comprising providing an application programming interface (API) configured to provide, at runtime, the modeled memory bandwidth patterns to applications executing on the multi-core system.

9. A system, comprising:
- one or more computing devices; and
- a memory coupled to the one or more computing devices comprising program instructions executable by the one or more computing device to:
  - model memory bandwidth patterns for a multi-core system comprising multiple sockets, each of which comprises multiple cores, wherein said modeling is based at least in part on results from executing one or more profiling sessions on the multi-core system and the values of the one or more machine performance counters configured to indicate amounts of data transferred on respective sockets of the multi-core system;
  - wherein to model the memory bandwidth patterns, the program instructions are further executable to:
    - execute a workload on the multi-core system, comprising executing multiple threads of the workload on the multi-core system;
    - determine, for a plurality of bandwidth classes, respective amounts of the workload's total memory accesses, in terms of amount of data transferred, that corresponds to respective ones of the plurality of bandwidth classes, wherein the plurality of bandwidth classes represent different types of memory access by the workload when executing on the multi-core system, wherein said determining is based, at least in part, on the values of the machine performance counters;
    - wherein the bandwidth classes comprise one or more of:
      - static memory access representing accesses to memory allocated in a single memory bank used by all threads of the workload;
      - local memory access representing accesses to memory by threads on the same sockets as which the memory is allocated;
      - interleaved shared memory access representing accesses to memory allocated evenly across the sockets; or
      - per-thread shared memory access representing accesses to memory allocated by one thread and used by all threads of the workload; and
    - allocate, for an application executing on the multi-core system, memory to be accessed by one or more threads of the application, according to the modeled memory bandwidth patterns.

10. The system of claim 9, wherein the program instructions are further executable to determine is based, at least in part on one or more values of machine performance counters indicating one or more of:
- a number of local memory accesses performed by the workload;
- a number of remote memory accesses performed by the workload;
- a total number of instructions executed per-thread by the workload; or
- a total amount of time over which the total number of instructions were executed by the workload.

11. The system of claim 9, wherein the program instructions are further executable to determine the respective amounts of the workload's total memory accesses based, at least in part on one or more values of machine performance counters indicating one or more of:
- an amount of data sent to and from a local memory bank local to a CPU on which a particular thread of the workload is executing; or
- an amount of data sent to and from one or more remote memory banks distinct from the local memory bank.

12. The system of claim 9, wherein to execute the workload the program instructions are further executable to execute one or more profiling runs on the multi-core system comprising a plurality of thread placements.

13. A non-transitory, computer-readable storage medium storing program instructions that when executed on one or more computer devices comprising persistent memory cause the one or more computing devices to perform:
- modeling memory bandwidth patterns for a multi-core system comprising multiple sockets, each of which comprises multiple cores, wherein said modeling is based at least in part on results from executing one or more profiling sessions on the multi-core system and the values of the one or more machine performance counters configured to indicate amounts of data transferred on respective sockets of the multi-core system;
- wherein said modeling comprises:
  - executing a workload on the multi-core system, comprising executing multiple threads of the workload on the multi-core system;
    - determining, for a plurality of bandwidth classes, respective amounts of the workload's total memory accesses, in terms of amount of data transferred, that corresponds to respective ones of the plurality of bandwidth classes, wherein the plurality of bandwidth classes represent different types of memory access by the workload when executing on the multi-core system, wherein said determining is based, at least in part, on the values of the machine performance counters;
  - wherein the bandwidth classes comprise one or more of:
    - static memory access representing accesses to memory allocated in a single memory bank used by all threads of the workload;
    - local memory access representing accesses to memory by threads on the same sockets as which the memory is allocated;
    - interleaved shared memory access representing accesses to memory allocated evenly across the sockets; or
    - per-thread shared memory access representing accesses to memory allocated by one thread and used by all threads of the workload; and
  - providing an application programming interface (API) configured to provide, at runtime, the modeled memory bandwidth patterns to applications executing on the multi-core system.

14. The non-transitory, computer-readable storage medium of claim 13, wherein said determining is based, at least in part on one or more values of machine performance counters indicating one or more of:
- a number of local memory accesses performed by the workload;
- a number of remote memory accesses performed by the workload;
- a total number of instructions executed per-thread by the workload; or
- a total amount of time over which the total number of instructions were executed by the workload.

15. The non-transitory, computer-readable storage medium of claim 13, wherein said determining is based, at least in part on one or more values of machine performance counters indicating one or more of:
- an amount of data sent to and from a local memory bank local to a CPU on which a particular thread of the workload is executing; or
- an amount of data sent to and from one or more remote memory banks distinct from the local memory bank.

16. The non-transitory, computer-readable storage medium of claim 13, wherein said executing the workload comprises executing one or more profiling runs on the multi-core system comprising a plurality of thread placements.

* * * * *

UNITED STATES PATENT AND TRADEMARK OFFICE
CERTIFICATE OF CORRECTION

PATENT NO. : 10,871,996 B2
APPLICATION NO. : 16/163462
DATED : December 22, 2020
INVENTOR(S) : Goodman et al.

It is certified that error appears in the above-identified patent and that said Letters Patent is hereby corrected as shown below:

On the Title Page

Item (54) Title, Line 2, delete "BANDWITH" and insert -- BANDWIDTH --, therefor.

Column 2, item (57) under Abstract, Line 11, before "information" insert -- include --.

On Page 2, Column 1, item (56) under Other Publications, Line 15, delete "Bergey" and insert -- Sergey --, therefor.

On Page 2, Column 1, item (56) under Other Publications, Line 21, delete "L:argi" and insert -- Cargi --, therefor.

On Page 2, Column 1, item (56) under Other Publications, Line 23, delete "Bergey" and insert -- Sergey --, therefor.

On Page 2, Column 1, item (56) under Other Publications, Line 25, delete "Cashe" and insert -- Cache --, therefor.

On Page 2, Column 2, item (56) under Other Publications, Line 31, delete "Nest" and insert -- West --, therefor.

In the Specification

In Column 1, Line 2, delete "BANDWITH" and insert -- BANDWIDTH --, therefor.

In Column 1, Line 53, delete "FIG." and insert -- FIGS. --, therefor.

In Column 1, Line 61, delete "FIG." and insert -- FIGS. --, therefor.

In Column 4, Line 17, delete "program ,etc.," and insert -- program, etc., --, therefor.

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)

U.S. Pat. No. 10,871,996 B2

In Column 7, Line 65, delete "FIG." and insert -- FIGS. --, therefor.

In Column 8, Line 1, delete "FIG." and insert -- FIGS. --, therefor.

In Column 11, Lines 30-31, delete "FIG. 8A-B. FIG. 8A-B" and insert -- FIGS. 8A-B. FIGS. 8A-B --, therefor.

In Columns 12-13, Lines 64-67 (Column 12), 1-3 (Column 13), delete "An example can be seen in FIG. 9. To do this for each memory bank, in some embodiments bandwidth modeler 110 may be configured to record the remote reads, the remote writes, the local reads, and the local writes. Each of these may then be divided by the average number of instructions executed by the threads on the socket that that traffic was to or from." and insert the same on Column 12, Line 63, as continuation of same paragraph.

In Column 13, Line 2, delete "that that" and insert -- that --, therefor.

In Column 14, Line 53, delete "$d'_{local\ reads\ 2} = d_{local\ reads\ 2}$" and insert -- $d''_{local\ reads\ 2} = d'_{local\ reads\ 2}$ --, therefor.

In Columns 14-15, Lines 62-67 (Column 14), 2-7 (Column 15), delete "This may be called the local fraction (1).
i≠j
$$l = \frac{local\ accesses_{bank_i}}{local\ accesses_{bank_i} + remote\ accesses_{bank_j}}$$
in the worked example, these may be 2/3 and 1/3 for sockets 1 and 2 respectively, according to one example embodiment." and insert the same on Column 14, Line 61, as continuation of same paragraph.

In Column 17, Line 44, after "predictor" insert -- . --.

In Column 17, Line 67, delete "OpenMPTM," and insert -- OpenMP™, --, therefor.

In Column 20, Line 51, delete "whether" and insert -- Whether --, therefor.

In Column 25, Line 8, delete "(0$_s$)" and insert -- o$_s$ --, therefor.

In Column 25, Line 26, delete "factorfusable" and insert -- factor f usable --, therefor.

In Column 26, Line 51, delete "tl" and insert -- t1 --, therefor.

In Column 26, Line 64, delete "$r_x = t_x/t_l$" and insert -- $r_x = t_x/t_1$ --, therefor.

In Column 26, Line 64, delete "rx" and insert -- $r_x$ --, therefor.

In Column 27, Line 2, after "$u_x = r_x/k_x$" insert -- . --.

CERTIFICATE OF CORRECTION (continued)
U.S. Pat. No. 10,871,996 B2

In Column 27, Line 13, delete "ofp." and insert -- of p. --, therefor.

In Column 28, Lines 37-40, delete "$S_{bal} = \left((1-p) \times s_{min} + np \bigg/ \left(\sum_{i=1}^{n} \frac{1}{s_1}\right)\right)$" and insert -- $S_{bal} = \left((1-p) \times s_{min} + np/\left(\sum_{i=1}^{n} \frac{1}{s_i}\right)\right)$ --, therefor.

In Column 28, Line 43, delete "($s_i$)" and insert -- ($s_l$) --, therefor.

In Column 28, Line 45, delete "$s_i$==" and insert -- $s_l$= --, therefor.

In Column 28, Line 55, delete "$u_S/u_2=S_l$" and insert -- $u_S/u_2=S_l$ --, therefor.

In Column 29, Line 12, delete "usea" and insert -- used --, therefor.

In Column 29, Line 12, delete "tnere" and insert -- there --, therefor.

In Column 30, Lines 31-35, delete "Additionally, alternating between (i) modeling the contention for hardware resources occurring as the threads execute, and (ii) Adding or removing slowdown attributed to communication and synchronization may also be used, in some embodiments." and insert the same on Column 30, Line 30 (approx.), as continuation of same paragraph.

In Column 31, Line 43, delete "$b'=1+b \times f_b f_b=0.83$" and insert
-- $b' = 1 + b \times f_b$    $f_b = 0.83$ --, therefor.

In Column 33, Line 1, delete "comm. slowdown(i)=l" and insert -- comm.slowdown(i)=l --, therefor.

In Column 34, Line 8, delete "1+1" and insert -- i+1 --, therefor.

In Column 34, Line 9, delete "1+1." and insert -- i+1. --, therefor.

In Column 34, Line 19, delete "this" and insert -- This --, therefor.

In Column 34, Lines 48-51, delete "FIG. 23. Comparing the resource demands illustrated in FIG. 22 with those in FIG. 23, the load imposed by thread W is reduced (e.g., significantly), but the interconnect remains the bottleneck." and insert the same on Column 34, Line 47 (approx.), as the continuation of same paragraph.

In Column 35, Lines 15-17, delete "To prevent this and to allow measurement of the benchmarks in a stable state, autonuma may be disabled in all tests." and insert the same on Column 35, Line 14, as continuation of same paragraph.

In Column 37, Lines 15-28, delete "optical storage, magnetic storage, hard drive, tape drive, solid state memory, etc.) and one or more system memories 2410 (e.g., one or more of cache, SRAM, DRAM,

CERTIFICATE OF CORRECTION (continued)
U.S. Pat. No. 10,871,996 B2

RDRAM, EDO RAM, DDR 10 RAM, SDRAM, Rambus RAM, EEPROM, etc.). In some embodiments, one or more of the storage device(s) 2450 may be implemented as a module on a memory bus (e.g., on interconnect 2440) that is similar in form and/or function to a single in-line memory module (SIMM) or to a dual in-line memory module (DIMM). Various embodiments may include fewer or additional components not illustrated in FIG. 24 (e.g., video cards, audio cards, additional network interfaces, peripheral devices, a network interface such as an ATM interface, an Ethernet interface, a Frame Relay interface, etc.)" and insert the same on Column 37, Line 14, as continuation of same paragraph.